(12) United States Patent
Kourtoff

(10) Patent No.: US 12,129,835 B1
(45) Date of Patent: Oct. 29, 2024

(54) VEHICULAR WIND TURBINE SYSTEM FOR DRAG REDUCTION

(71) Applicant: PURUS POWER CORPORATION, Brampton (CA)

(72) Inventor: John Michael Kourtoff, Toronto (CA)

(73) Assignee: PURUS POWER CORPORATION, Brampton (CA)

( * ) Notice: Subject to any disclaimer, the term of this patent is extended or adjusted under 35 U.S.C. 154(b) by 0 days.

(21) Appl. No.: 18/618,165

(22) Filed: Mar. 27, 2024

(51) Int. Cl.
| | |
|---|---|
| *F03D 9/32* | (2016.01) |
| *B62D 35/00* | (2006.01) |
| *F03D 1/04* | (2006.01) |
| *F03D 9/25* | (2016.01) |

(52) U.S. Cl.
CPC .............. *F03D 9/32* (2016.05); *B62D 35/001* (2013.01); *F03D 1/04* (2013.01); *F03D 9/25* (2016.05); *F05B 2240/923* (2013.01); *F05B 2240/931* (2013.01); *F05B 2240/941* (2013.01)

(58) Field of Classification Search
None
See application file for complete search history.

(56) References Cited

U.S. PATENT DOCUMENTS

| | | |
|---|---|---|
| 3,934,923 A | 1/1976 | Lissaman et al. |
| 4,076,448 A | 2/1978 | Sanders, Jr. |
| 4,084,918 A | 4/1978 | Pavlecka |
| 4,168,759 A | 9/1979 | Hull et al. |
| 4,227,855 A | 10/1980 | Flynn et al. |

(Continued)

FOREIGN PATENT DOCUMENTS

| | | |
|---|---|---|
| CA | 3092026 A1 | 8/2020 |
| CA | 3060653 A1 | 4/2021 |

(Continued)

OTHER PUBLICATIONS

Cho S-Y, "An experimental study of the optimal design parameters of a wind power tower used to improve the performance of vertical axis wind turbines." Advances in Mechanical Engineering. 2018; 10(9). doi:10.1177/1687814018799543, 10 pages.

(Continued)

*Primary Examiner* — Joseph D. Pape
(74) *Attorney, Agent, or Firm* — BERESKIN & PARR LLP/S.E.N.C.R.L., s.r.l.

(57) ABSTRACT

A passive vehicle drag reduction system including an airflow capture inlet, a flow consolidating conduit, an air driven rotor assembly, and one or more flow exhaust conduits. The airflow capture inlet defines an airflow capture inlet direction. The flow consolidating conduit is close sided. The air driven rotor assembly has a rotor assembly inlet and an air driven rotor. The rotor assembly inlet defines a rotor airflow inlet direction. The air driven rotor has a laterally extending rotation axis transverse to the rotor airflow inlet direction and one or more air redirecting blades defining one or more rotor airflow outlet directions substantially parallel to the rotation axis. Each of the one or more flow exhaust conduits has a redirecting exhaust outlet located laterally of the air driven rotor assembly. The redirecting exhaust outlet defines an exhaust outlet airflow direction that is substantially parallel to the airflow capture inlet direction.

20 Claims, 28 Drawing Sheets

(56) References Cited

U.S. PATENT DOCUMENTS

| | | | |
|---|---|---|---|
| 4,359,311 A | 11/1982 | Benesh | |
| 4,512,714 A | 4/1985 | Kaesser | |
| 6,465,899 B2 | 10/2002 | Roberts | |
| 6,638,005 B2 | 10/2003 | Holter et al. | |
| 6,838,782 B2 | 1/2005 | Vu | |
| 6,849,964 B2 | 2/2005 | Becherucci et al. | |
| 6,857,492 B1 | 2/2005 | Liskey et al. | |
| 7,329,965 B2 | 2/2008 | Roberts et al. | |
| 7,695,050 B2 * | 4/2010 | Neale | B62D 35/00 296/180.1 |
| 8,360,713 B2 | 1/2013 | Carosi et al. | |
| 8,362,636 B2 | 1/2013 | Ling | |
| 8,618,683 B2 | 12/2013 | Diaz | |
| 8,907,511 B2 | 12/2014 | Bowyer et al. | |
| 8,961,103 B1 | 2/2015 | Wolff | |
| 9,371,818 B1 | 6/2016 | Monto | |
| 9,573,697 B2 | 2/2017 | Criado et al. | |
| 9,744,927 B2 | 8/2017 | Karimirozbahani | |
| 9,863,403 B2 | 1/2018 | Gaither | |
| 9,926,912 B2 | 3/2018 | Deshpande et al. | |
| 10,767,631 B2 | 9/2020 | Ouchi | |
| 11,124,063 B2 | 9/2021 | Albrecht | |
| 11,187,207 B1 | 11/2021 | Perkins | |
| 11,215,160 B2 | 1/2022 | Huang et al. | |
| 11,230,329 B1 * | 1/2022 | White | B62D 35/007 |
| 11,286,907 B1 | 3/2022 | Rebek | |
| 11,434,870 B2 | 9/2022 | Suma et al. | |
| 11,767,090 B2 | 9/2023 | Mundon et al. | |
| 2005/0230980 A1 | 10/2005 | Brunet | |
| 2010/0001532 A1 | 1/2010 | Grumazescu | |
| 2011/0027084 A1 | 2/2011 | Rekret | |
| 2011/0033288 A1 | 2/2011 | Pezaris | |
| 2011/0037261 A1 | 2/2011 | Champ et al. | |
| 2011/0291420 A1 | 12/2011 | Gu | |
| 2012/0056428 A1 | 3/2012 | Bennett et al. | |
| 2013/0064660 A1 | 3/2013 | Hong | |
| 2020/0055403 A1 | 2/2020 | Overstreet | |
| 2021/0062789 A1 | 3/2021 | Parker | |
| 2021/0122249 A1 | 4/2021 | Maury et al. | |
| 2022/0409454 A1 | 12/2022 | Bekoscke et al. | |
| 2023/0339332 A1 | 10/2023 | Maury et al. | |

FOREIGN PATENT DOCUMENTS

| | | |
|---|---|---|
| CN | 104389741 A | 3/2015 |
| DE | 3829112 A1 | 3/1990 |
| DE | 19648632 A1 | 4/1998 |
| DE | 102005041600 B3 | 12/2006 |
| DE | 202009001926 U1 | 6/2010 |
| DE | 102015002670 A1 | 9/2016 |
| EP | 4273394 A1 | 11/2023 |
| WO | 2013041632 A2 | 3/2013 |
| WO | 2023020866 A1 | 2/2023 |

OTHER PUBLICATIONS

Schlueter-Kuck KL, "Coherent structure colouring: identification of coherent structures from sparse data using graph theory." Journal of Fluid Mechanics. 2017; 811: pp. 468-486. doi:10.1017/jfm.2016.755.

Schmid, Peter J. "Chapter Six—Data-driven and operator-based tools for the analysis of turbulent flows," Editor(s): Paul Durbin, Advanced Approaches in Turbulence, Elsevier, 2021, pp. 243-305, ISBN 9780128207741, doi:10.1016/B978-0-12-820774-1.00012-4.

Inhabitat, "The Maglev: The Super-powered Magnetic Wind Turbine," by Inhabitat, Nov. 26, 2007. Available online: https://inhabitat.com/super-powered-magnetic-wind-turbine-maglev/, 3 pages.

* cited by examiner

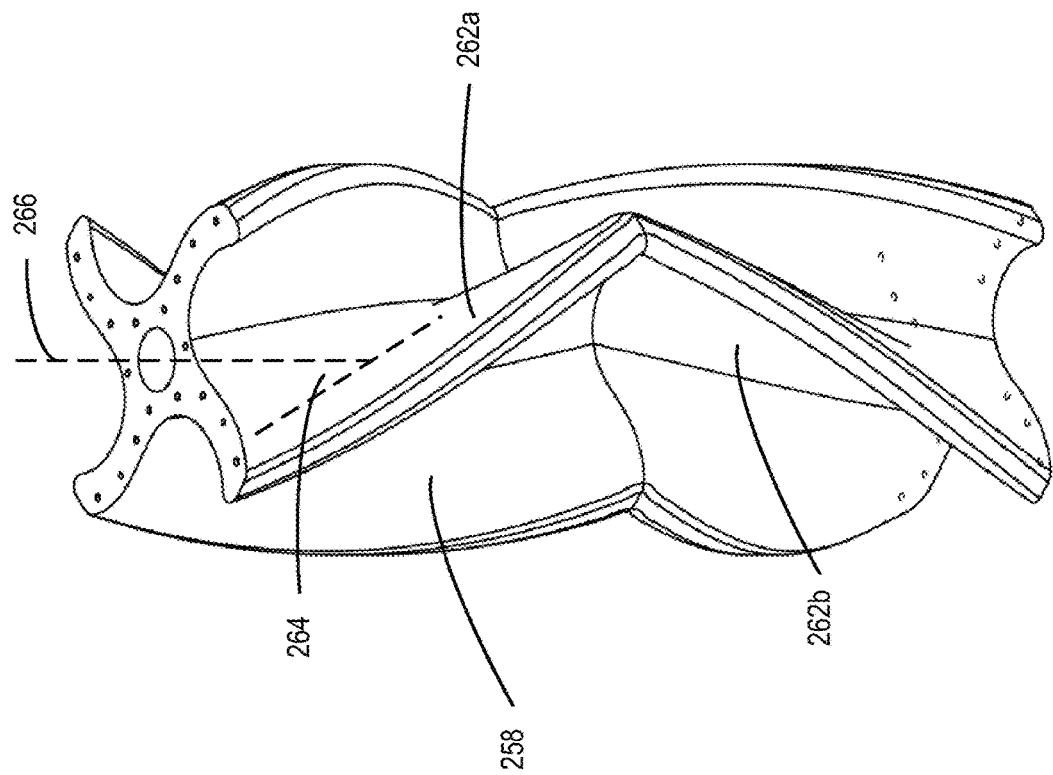
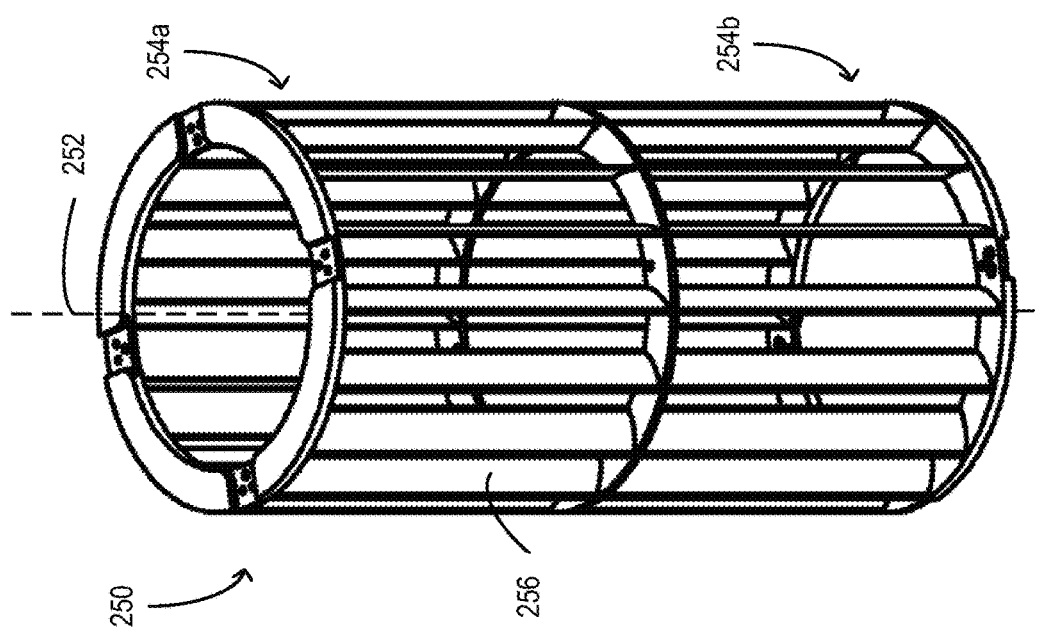
FIG. 6B
FIG. 6A

VEHICULAR WIND TURBINE SYSTEM FOR DRAG REDUCTION

FIELD

This application relates generally to the field of wind turbines, and more specifically to vehicular wind turbine systems for drag reduction.

INTRODUCTION

Vehicles in motion are impacted by aerodynamic drag. The vehicle's shape and/or surface texture typically contribute to the magnitude of the aerodynamic drag. Aerodynamic drag can reduce the vehicle's mileage. For example, high aerodynamic drag will require greater power to overcome, and consequently cause the vehicle to consume more energy (e.g. from fuel and/or electricity) to maintain the vehicle's speed all else being equal.

SUMMARY

The following is intended to introduce the reader to the detailed description that follows and not to define or limit the claimed subject matter.

In one aspect, a vehicle is disclosed. The vehicle includes a vehicle body having a front portion, and a wind turbine system. The front portion defines a first forward projection area. The wind turbine system includes an airflow capture inlet, a flow consolidating conduit, an air driven rotor assembly, and an electric generator. The airflow capture inlet has an inlet upstream end, an inlet downstream end, an air entry window, and a flow directing floor. Each of the air entry window and the flow directing floor extends from the inlet upstream end to the inlet downstream end. The air entry window defines a second forward projection area that is at least 10% of the first forward projection area. The flow directing floor is sloped upwardly from the inlet upstream end toward the inlet downstream end. The flow consolidating conduit is close sided and extends from a consolidating conduit upstream end at the inlet downstream end, to a consolidating conduit downstream end. The air driven rotor assembly has a rotor assembly upstream end located downstream of the consolidating conduit downstream end. The air driven rotor assembly includes an air driven rotor. The electric generator is connected to the air driven rotor.

In another aspect, a vehicular wind turbine system is disclosed. The vehicular wind turbine system includes an airflow capture inlet, a flow consolidating conduit, and an air driven rotor assembly. The airflow capture inlet has an inlet upstream end, an inlet downstream end, an air entry window, and a concave flow directing floor. Each of the air entry window and the concave flow directing floor extends from the inlet upstream end to the inlet downstream end. The concave flow directing floor is sloped upwardly from the inlet upstream end toward the inlet downstream end. The flow consolidating conduit is close sided and extends from a consolidating conduit upstream end at the inlet downstream end, to a consolidating conduit downstream end. The flow consolidating conduit includes a convex conduit floor that is contiguous with the concave flow directing floor. The air driven rotor assembly has a rotor assembly upstream end located downstream of the consolidating conduit downstream end. The air driven rotor assembly includes an air driven rotor.

In another aspect, a vehicular wind turbine system is disclosed. The vehicular wind turbine system includes an airflow capture inlet, a flow consolidating conduit, and an air driven rotor assembly. The airflow capture inlet has an inlet upstream end, an inlet downstream end, an air entry window, and a flow directing floor. Each of the air entry window and the flow directing floor extends from the inlet upstream end to the inlet downstream end. The flow directing floor is sloped upwardly from the inlet upstream end toward the inlet downstream end. The flow consolidating conduit is close sided and extends from a consolidating conduit upstream end at the inlet downstream end, to a consolidating conduit downstream end. The flow consolidating conduit includes one or more flow partitions that subdivide a cross-sectional area of the flow consolidating conduit into two or more flow paths. Each flow partition and each flow path extends between the consolidating conduit upstream end and the consolidating conduit downstream end. Each flow partition has a partition downstream end located upstream of the consolidating conduit downstream end. Each flow path adjacent each flow partition merges at each partition downstream end into a merged flow path. The cross-sectional area of the flow consolidating conduit decreases between the consolidating conduit upstream end and the consolidating conduit downstream end toward the consolidating conduit downstream end. The air driven rotor assembly has a rotor assembly upstream end located downstream of the consolidating conduit downstream end. The air driven rotor assembly includes an air driven rotor.

In another aspect, a method of generating energy in an electric vehicle is disclosed. The electric vehicle includes a wind turbine system, and at least one electric motor electrically connected to an energy storage member. The method includes powering the at least one electric motor using the energy storage member to drive the electric vehicle forwardly. A front portion of the electric vehicle is impacted by wind. The method includes capturing the wind as airflow in an airflow capture inlet of the wind turbine system. The method includes directing the airflow through a flow consolidating conduit of the wind turbine system. The flow consolidating conduit has a cross-sectional area that decreases towards a downstream end of the flow consolidating conduit. The airflow exits the flow consolidating conduit as consolidated airflow. The method includes directing the consolidated airflow through an air driven rotor assembly driving an electric generator and discharging the consolidated airflow along lateral sides of the electric vehicle. The method includes generating the energy at the electric generator. The method includes delivering the generated energy to the energy storage member.

In another aspect, a wind deflector securable above a tractor unit is disclosed. The wind deflector includes a wind deflector body having a front portion, and a wind turbine system. The front portion defines a first forward projection area. The wind turbine system includes an airflow capture inlet, a flow consolidating conduit, and an air driven rotor assembly. The airflow capture inlet has an inlet upstream end, an inlet downstream end, an air entry window, and a flow directing floor. Each of the air entry window and the flow directing floor extends from the inlet upstream end to the inlet downstream end. The air entry window defines a second forward projection area that is at least 10% of the first forward projection area. The flow directing floor is sloped upwardly from the inlet upstream end toward the inlet downstream end. The flow consolidating conduit is close sided and extends from a consolidating conduit upstream end at the inlet downstream end, to a consolidating conduit downstream end. The air driven rotor assembly has a rotor assembly upstream end located downstream of the consolidating conduit downstream end. The air driven rotor assembly includes an air driven rotor.

In another aspect, a vehicular wind turbine system is disclosed. The vehicular wind turbine system includes an airflow capture inlet, a flow consolidating conduit, and an air driven rotor assembly. The airflow capture inlet has an inlet upstream end, an inlet downstream end, an air entry window, and a flow directing floor. The air entry window defines a forward projection area. The flow directing floor is sloped upwardly from the inlet upstream end toward the inlet downstream end. The flow consolidating conduit is close sided and extends from a consolidating conduit upstream end at the inlet downstream end, to a consolidating conduit downstream end. The flow consolidating conduit has a cross-sectional area at the consolidating conduit upstream end. The forward projection area is 2 to 50 times the cross-sectional area. The air driven rotor assembly has a rotor assembly upstream end located downstream of the consolidating conduit downstream end. The air driven rotor assembly includes an air driven rotor.

In another aspect a passive vehicle drag reduction system is disclosed. The passive vehicle drag reduction system includes an airflow capture inlet, a flow consolidating conduit, an air driven rotor assembly, and one or more flow exhaust conduits. The airflow capture inlet has an inlet upstream end, an inlet downstream end, an air entry window, and a flow directing floor. Each of the air entry window and the flow directing floor extends from the inlet upstream end to the inlet downstream end. The flow directing floor is sloped upwardly from the inlet upstream end toward the inlet downstream end. The airflow capture inlet defines an airflow capture inlet direction. The flow consolidating conduit is close sided and extends from a consolidating conduit upstream end at the inlet downstream end, to a consolidating conduit downstream end. The air driven rotor assembly has a rotor assembly inlet located downstream of the consolidating conduit downstream end, and an air driven rotor. The rotor assembly inlet defines a rotor airflow inlet direction. The air driven rotor has a laterally extending rotation axis transverse to the rotor airflow inlet direction, a plurality of air driven blades, and one or more air redirecting blades interior of the plurality of air driven blades. The air redirecting blades define one or more rotor airflow outlet directions substantially parallel to the rotation axis. The one or more flow exhaust conduits are downstream of the air driven rotor assembly. Each of the one or more flow exhaust conduits is close sided and has a redirecting exhaust outlet located laterally of the air driven rotor assembly. The redirecting exhaust outlet defines an exhaust outlet airflow direction that is substantially parallel to the airflow capture inlet direction.

In another aspect, a method of reducing aerodynamic drag of a vehicle is disclosed. The vehicle includes a passive vehicle drag reduction system. The method includes driving the vehicle forwardly. A front portion of the vehicle is impacted by wind. The method includes capturing the wind as airflow in an airflow capture inlet of the passive vehicle drag reduction system. The airflow capture inlet defines an airflow capture inlet direction. The method includes directing the airflow through a flow consolidating conduit of the passive vehicle drag reduction system. The flow consolidating conduit has a cross-sectional area that decreases towards a downstream end of the flow consolidating conduit. The airflow exits the flow consolidating conduit as consolidated airflow. The method includes directing the consolidated airflow through an air driven rotor assembly of the passive vehicle drag reduction system. The air driven rotor assembly has one or more air redirecting blades. The consolidated airflow exits the air driven rotor assembly as redirected airflow. The method includes directing the redirected airflow through one or more flow exhaust conduits of the passive vehicle drag reduction system. The one or more flow exhaust conduits have a redirecting exhaust outlet located laterally of the air driven rotor assembly. The redirected airflow exits the one or more flow exhaust conduits through the redirecting exhaust outlet in an exhaust outlet airflow direction that is substantially parallel to the airflow capture inlet direction.

In another aspect a vehicle is disclosed. The vehicle includes a vehicle body having a front portion and a passive vehicle drag reduction system. The front portion defines a first forward projection area. The passive vehicle drag reduction system includes an airflow capture inlet, a flow consolidating conduit, an air driven rotor assembly, and one or more flow exhaust conduits. The airflow capture inlet has an inlet upstream end, an inlet downstream end, an air entry window, and a flow directing floor. Each of the air entry window and the flow directing floor extends from the inlet upstream end to the inlet downstream end. The air entry window defines a second forward projection area that is at least 10% of the first forward projection area. The flow directing floor is sloped upwardly from the inlet upstream end toward the inlet downstream end. The airflow capture inlet defines an airflow capture inlet direction. The flow consolidating conduit is close sided and extends from a consolidating conduit upstream end at the inlet downstream end, to a consolidating conduit downstream end. The air driven rotor assembly has a rotor assembly inlet located downstream of the consolidating conduit downstream end, and an air driven rotor. The rotor assembly inlet defines a rotor airflow inlet direction. The air driven rotor has a laterally extending rotation axis transverse to the rotor airflow inlet direction, a plurality of air driven blades, and one or more air redirecting blades interior of the plurality of air driven blades. The air redirecting blades define one or more rotor airflow outlet directions substantially parallel to the rotation axis. The one or more flow exhaust conduits are downstream of the air driven rotor assembly. Each of the one or more flow exhaust conduits is close sided and has a redirecting exhaust outlet located laterally of the air driven rotor assembly. The redirecting exhaust outlet defines an exhaust outlet airflow direction that is substantially parallel to the airflow capture inlet direction.

Other aspects and features of the teachings disclosed herein will become apparent to those ordinarily skilled in the art, upon review of the following description of the specific examples of the present disclosure.

DRAWINGS

The drawings included herewith are for illustrating various examples of apparatuses and methods of the present disclosure and are not intended to limit the scope of what is taught in any way. In the drawings:

FIG. 6A is a front perspective view of an outer portion of an air driven rotor assembly of the wind turbine system of FIG. 1;

FIG. 6B is a front perspective view of an inner portion of an air driven rotor assembly of the wind turbine system of FIG. 1;

Figure 1A:
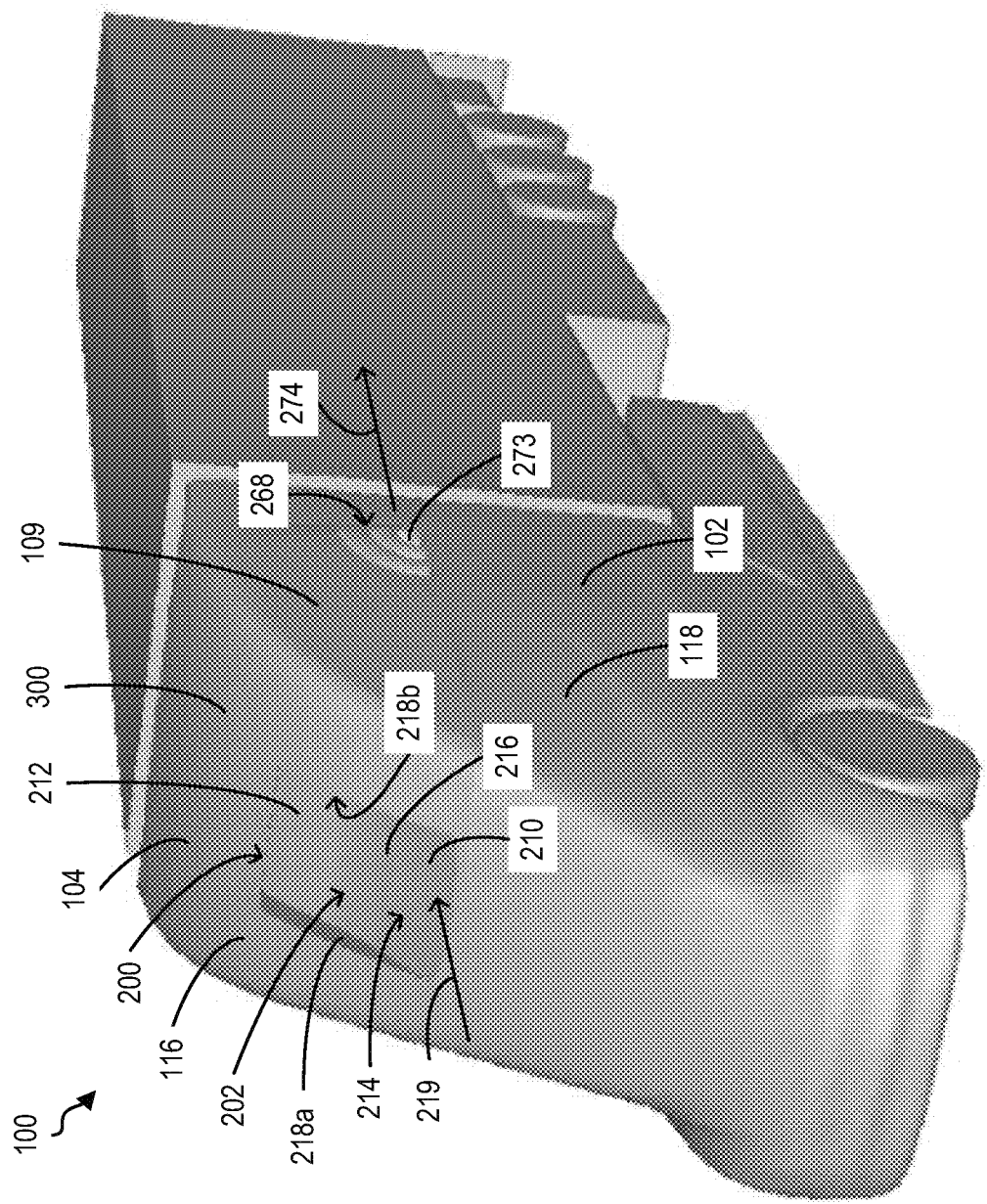
FIG. 1A is a front perspective view of an example vehicle including a wind turbine system according to aspects of the teaching disclosed herein.

Further aspects and features of the example embodiments described herein will appear from the following description taken together with the accompanying drawings.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a group of elements are said to 'collectively' perform an act where that act is performed by any one of the elements in the group, or performed cooperatively by two or more (or all) elements in the group.

As used herein and in the claims, the term "transverse" means within 45 degrees of perpendicular.

As used herein and in the claims, two elements are considered "parallel" where those two elements are colinear or are oriented in the same direction and spaced apart.

As used herein and in the claims, an open sided conduit is one that has an open side wall (i.e. opening) which extends from the conduit upstream end to the conduit downstream end.

As used herein and in the claims, the term "electric vehicle" may include vehicles having electric powertrains, hybrid powertrains, and plug-in hybrid powertrains.

Some elements herein may be identified by a part number, which is composed of a base number followed by an alphabetical or subscript-numerical suffix (e.g. 112a, or $112_1$). Multiple elements herein may be identified by part numbers that share a base number in common and that differ by their suffixes (e.g. $112_1$, $112_2$, and $112_3$). All elements with a common base number may be referred to collectively or generically using the base number without a suffix (e.g. 112).

Electric vehicles can be beneficial to the environment as they tend to leave a smaller environmental footprint (e.g., lower emissions) than gasoline-powered vehicles. However, electric vehicles can be limited by the electric vehicle battery range. That is, an electric vehicle generally cannot travel as far on a single electric vehicle battery charge as a similar gasoline-powered vehicle can travel on a single tank of gas. Accordingly, users of electric vehicles are considered to have more limited range than gas vehicles, and this limitation creates "range anxiety" for some existing and prospective electric vehicle users. The limited range and associated range anxiety also apply to larger electric vehicles, such as trucks.

The systems, methods, and apparatuses described herein may be used on any type of vehicle. For clarity of illustration, the description will refer to a "vehicle" and/or an "electric vehicle" throughout. However, it should be understood that such references encompass any other type of vehicle, no matter whether the vehicle is an electric vehicle (e.g. uses electricity for motive force), a fuel consuming vehicle (e.g. burns gasoline or diesel for motive force), or a hybrid vehicle (e.g. capable of both using electricity and consuming fuel for motive force), and no matter whether the vehicle has an energy storage member (e.g., a battery) or otherwise utilizes electrical energy. Specific embodiments that include an electric generator may be suitable for vehicles that have an energy storage member (e.g., a battery) or otherwise utilize electrical energy to consume the generated electrical energy.

Power Generation

In one aspect, embodiments described herein include a vehicular wind turbine system for generating electricity for use by the electric vehicle to extend the vehicle's range and thereby mitigate the aforementioned limited range and associated range anxiety. A vehicle moving in a forward direction generally has a significant amount of wind impacting a front portion of the vehicle. A vehicle having a suitable wind turbine system can generate power using the wind impacting the front portion of the vehicle. Accordingly, at least some embodiments disclosed herein are configured to capture a large portion of the wind impacting the front portion of the vehicle to be directed through the wind turbine system.

The wind impacting the front portion of the vehicle can have high turbulence, particularly when the vehicle is travelling at high speeds. Airflow with high turbulence can cause a wind turbine system to operate less efficiently than if the airflow had lower turbulence. In particular, if airflow enters the rotor portion of a wind turbine system with high turbulence, the rotor portion will operate less efficiently (i.e. convert less of the wind energy to mechanical rotor rotation) than if the airflow entered with lower turbulence (i.e. higher flow coherence). Accordingly, at least some embodiments disclosed herein are configured to reduce the turbulence of the captured wind in a portion of the wind turbine system that is upstream of the rotor portion.

Without being limited by theory, it is also believed that the rotor portion of the wind turbine may operate more efficiently with a singular high velocity air flow. Accordingly, at least some embodiments disclosed herein may be configured to merge and/or consolidate and also accelerate the incoming airflow upstream of the rotor portion of the wind turbine system. That is, the airflow can enter the rotor portion of the wind turbine system as a consolidated singular flow, rather than, for example, as a plurality of discrete airflows that enter the rotor portion at different locations around a perimeter of the rotor portion.

Embodiments of the vehicular wind turbine system described herein may embody any one or more of the above described design aspects. For example, the disclosed vehicular wind turbine system may include an airflow capture inlet that can capture a large portion of the wind impacting the front portion of the vehicle that is then directed through the vehicular wind turbine system. Alternatively or in addition, the disclosed vehicular wind turbine system may include a concave flow directing floor upstream of a convex conduit floor to direct the captured wind through the vehicular wind turbine system. Alternatively or in addition, the disclosed vehicular wind turbine system may include a flow consolidating conduit having a decreasing cross-sectional area and one or more flow partitions to reduce the turbulence (and increase coherence) of the captured wind and consolidate the airflow. Other embodiments described herein may have none of the design aspects.

Figure 1B:
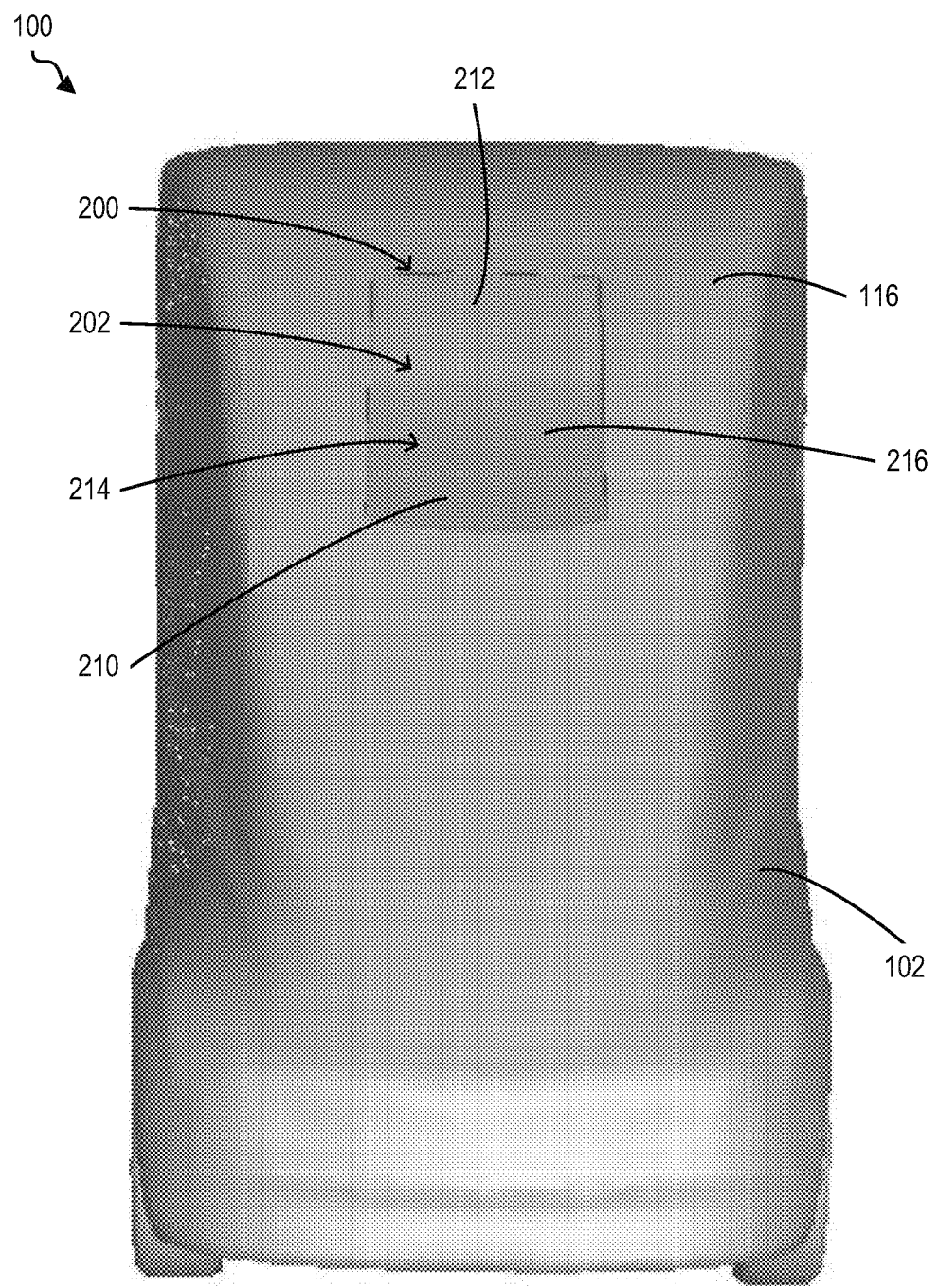
FIG. 1B is a front view of the vehicle of FIG. 1.

Referring now to FIGS. 1A and 1B, shown therein are a front perspective view and a front view, respectively, of a vehicle 100 including a wind turbine system 200. As shown, vehicle 100 includes a vehicle body 102. Vehicle body 102 has a body front portion 104 and a wind turbine system 200.

Figure 2A:
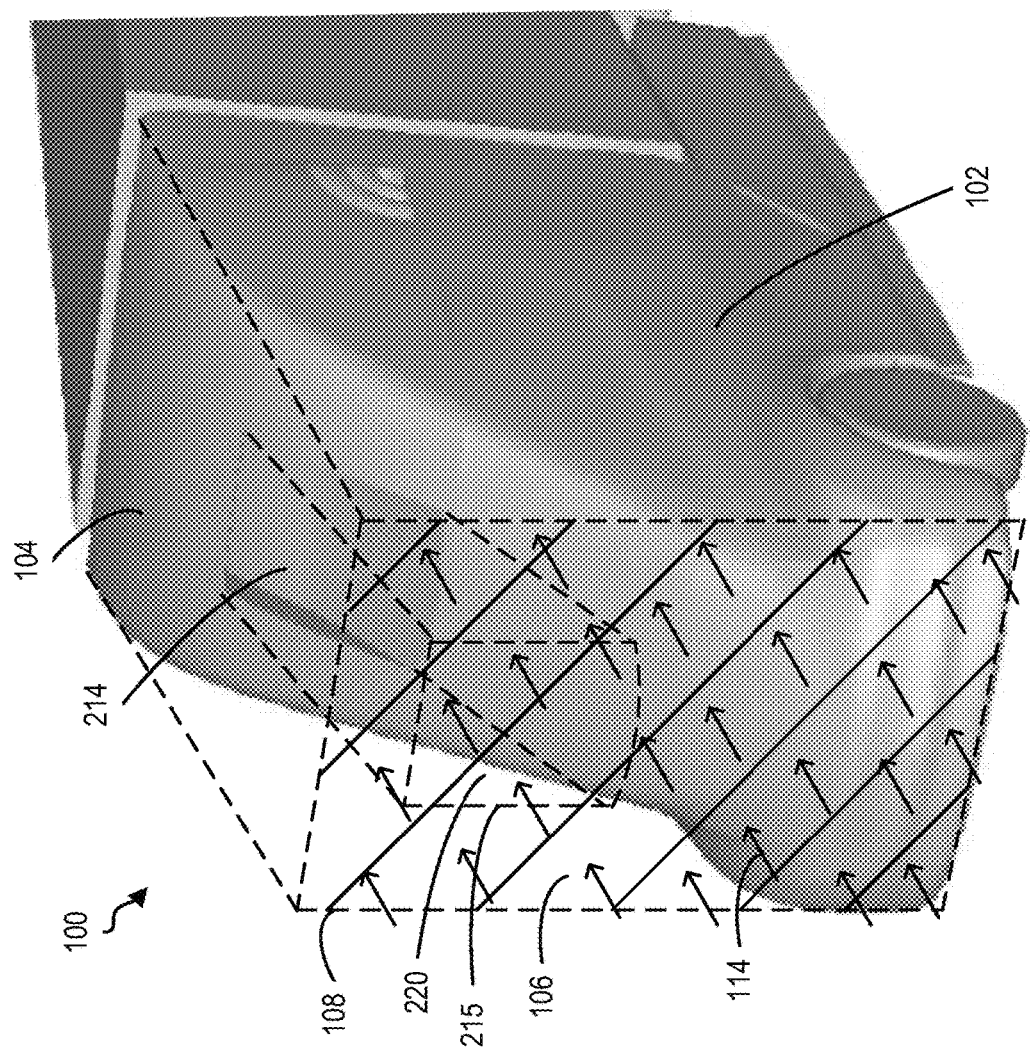
FIG. 2A is a front perspective view of the vehicle of FIG. 1 showing a forward projection of a vehicle body of the vehicle and a forward projection of a window portion of the wind turbine system of FIG. 1.
Figure 2B:
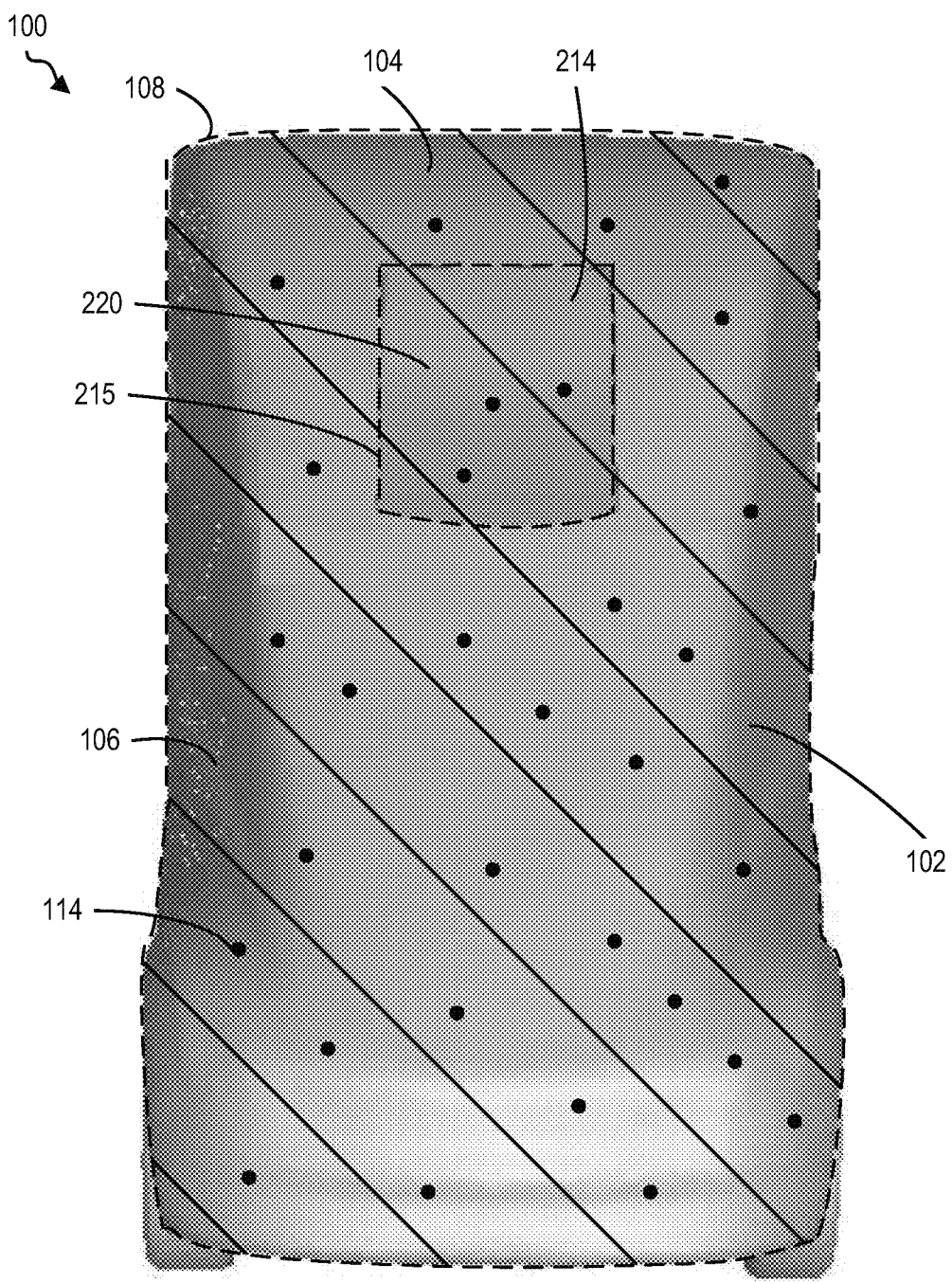
FIG. 2B is a front view of the vehicle of FIG. 1 showing a forward projection of a vehicle body of the vehicle and a forward projection of a window portion of the wind turbine system of FIG. 1.

Referring to FIGS. 2A and 2B, as shown, front portion 104 includes at least the portions of vehicle body 102 which are impacted by wind 114 when vehicle 100 is travelling forwards. Vehicle body 102 may be characterized as having a forward projection 108, which is a projection of front portion 104 forwardly onto a vertical plane as shown. The surface area of forward projection 108 is referred to as forward projection area 106 and represents the area of a vertical plane that is passed through by air 114 which impacts vehicle 100 when vehicle 100 is moving forwards (assuming that the ambient air is still and the relative velocity of the air to vehicle 100 is determined by the forward movement of vehicle 100). The proportion of (a) air striking a component of body front portion 104 to (b) the total air striking body front portion 104 when vehicle 100 is moving forward can be quantified by the relative size of the forward projection area of that component to the total size of forward projection area 106.

Figure 8:
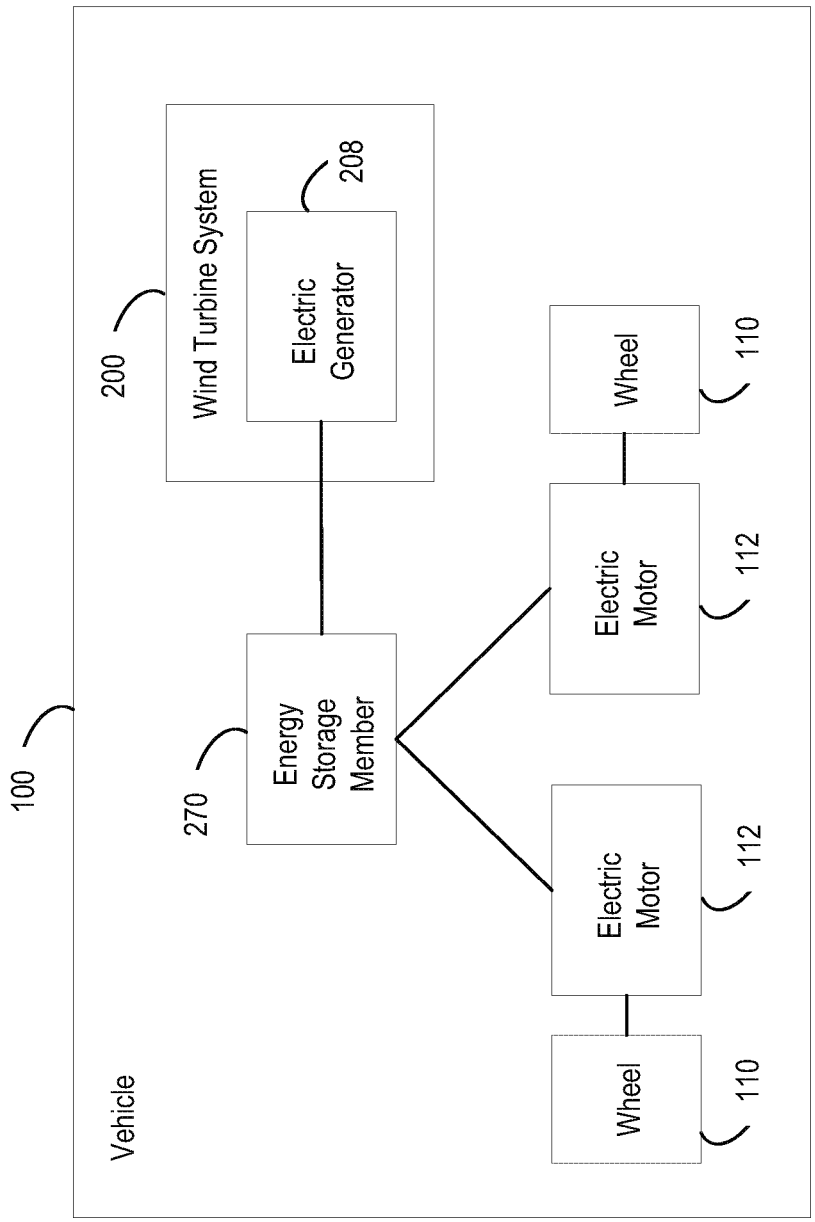
FIG. 8 is a schematic of the vehicle of FIG. 1.

Referring now to FIGS. 1A, 1B, 3A and 3B, wind turbine system 200 may include one or more (or all) of an airflow capture inlet 202, a flow consolidating conduit 204, an air driven rotor assembly 206, and an electric generator 208 (shown in FIG. 8). For example, some embodiments may omit electric generator 208 (shown in FIG. 8). Airflow capture inlet 202 captures wind 114 (shown in FIG. 2A) that impacts front portion 104 of vehicle body 102. Flow consolidating conduit 204 consolidates the captured wind into a consolidated airflow and directs the consolidated airflow to air driven rotor assembly 206. Air driven rotor assembly 206 is driven by the consolidated airflow from flow consolidating conduit 204. Electric generator 208 generates energy from the rotary force (torque) of air driven rotor assembly 206.

Figure 3A:
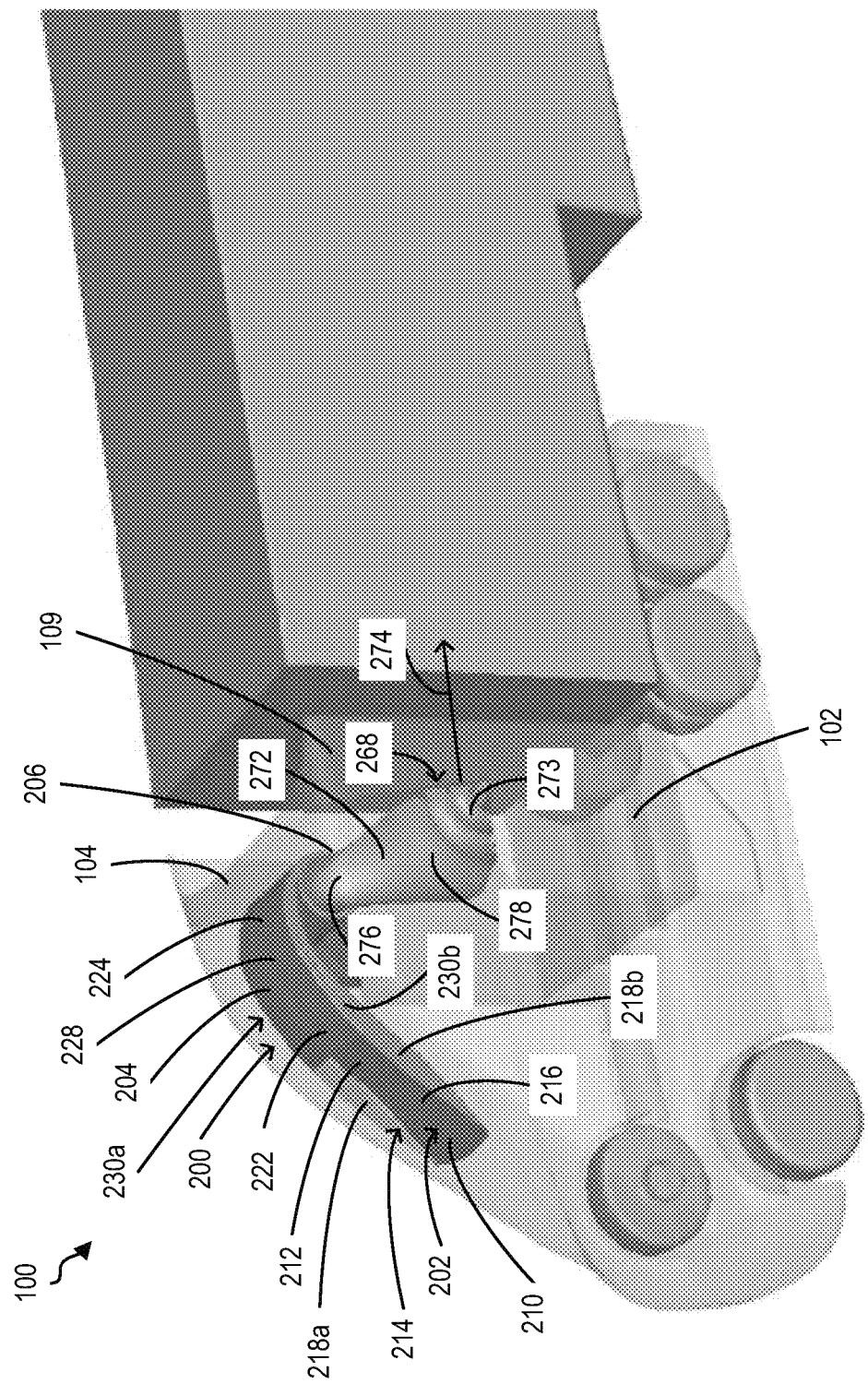
FIG. 3A is a side perspective semi-transparent view of the vehicle of FIG. 1 showing a portion of the wind turbine system.

Airflow capture inlet 202 may be positioned anywhere on body front portion 104 suitable for capturing airflow impacting body front portion 104. For example, the elevation of airflow capture inlet 202 may be such that it is located at an upper, middle, or lower region of body front portion 104. The preferred location may depend on where the specific vehicle has space to accommodate airflow capture inlet 202 and the remainder of wind turbine system 200. Alternatively or in addition, suitable locations may depend on the size of vehicle 100, the size of forward projection area 106 (shown in FIGS. 2A and 2B), the shape of body front portion 104 and/or the aerodynamic characteristics of body front portion 104. FIGS. 1A-1B show an example in which airflow capture inlet 202 is positioned proximate an upper end 116 of the vehicle body 102. In this example, vehicle 100 is depicted as a truck (e.g. transport truck) and airflow capture inlet 202 is formed in a wind deflector 300 above the cab 118. Wind deflector 300 may provide a suitable location for airflow capture inlet 202 because it is traditionally formed as a hollow body, which may allow it to accommodate the other components of wind turbine system 200 as shown in FIG. 3A. FIG. 9D shows an example in which airflow capture inlet 202 is positioned proximate a lower end 120 of vehicle body 102. In this example, vehicle 100 is depicted as a smaller automobile, such as a passenger car, and airflow capture inlet 202 is shown formed in one or both of the front bumper 122 and hood 124 of body front portion 104. Some small vehicles, such as electric vehicles, have storage compartments under the front hood and hollow front bumpers, which may be suitable for accommodating airflow capture inlet 202 and other components of wind turbine system 200.

Returning to FIGS. 1A-1B, airflow capture inlet 202 may be positioned with any horizontal alignment suitable for capturing airflow impacting body front portion 104. For example, airflow capture inlet 202 may be horizontally aligned to center as shown, or off-center such as proximate one side (e.g. left) or the other (e.g. right). The illustrated center alignment may help maintain the symmetry of vehicle body 102 for improved vehicle handling.

Figure 3B:
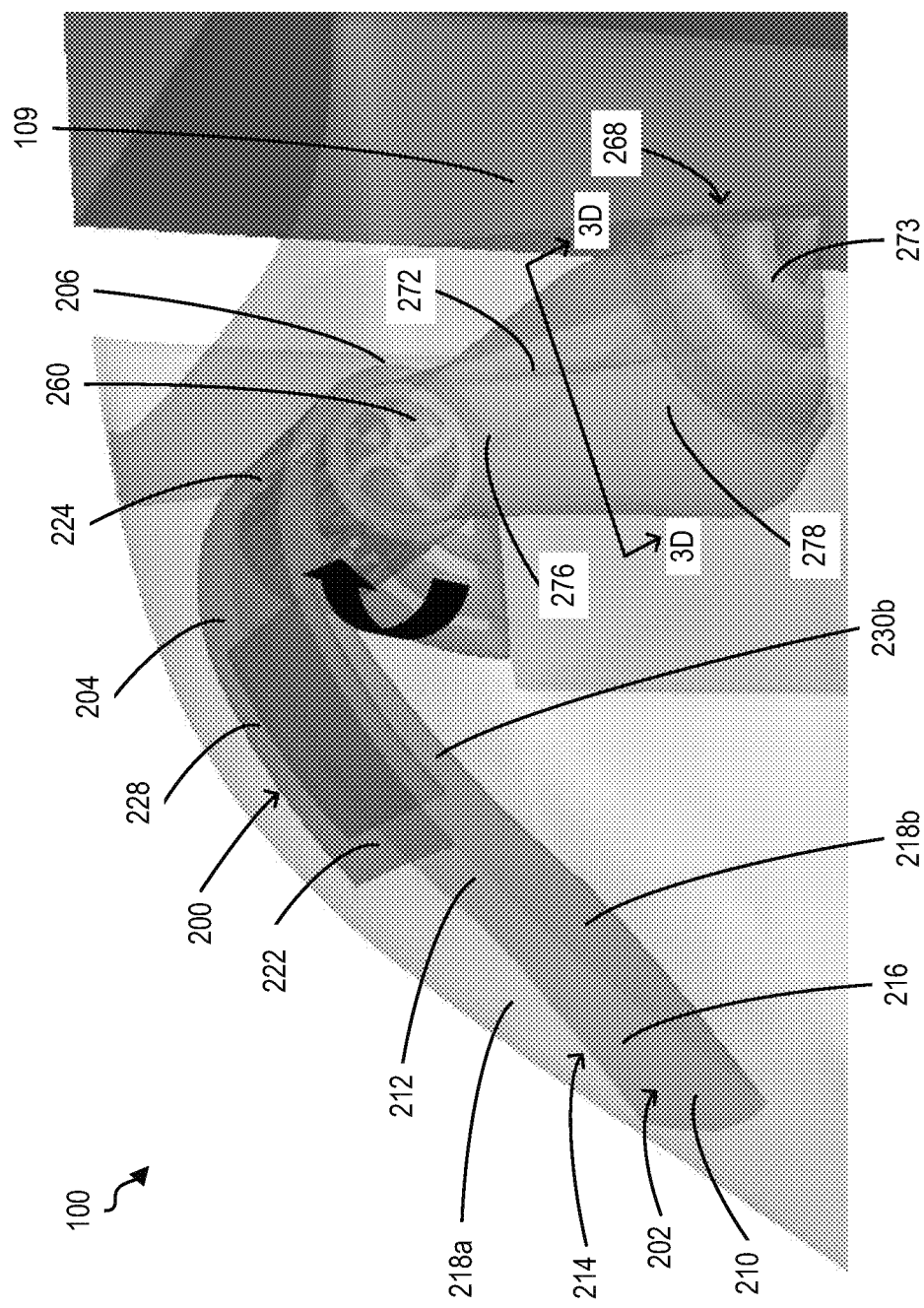
FIG. 3B is a detail side perspective semi-transparent view of the wind turbine system of FIG. 3A.
Figure 3C:
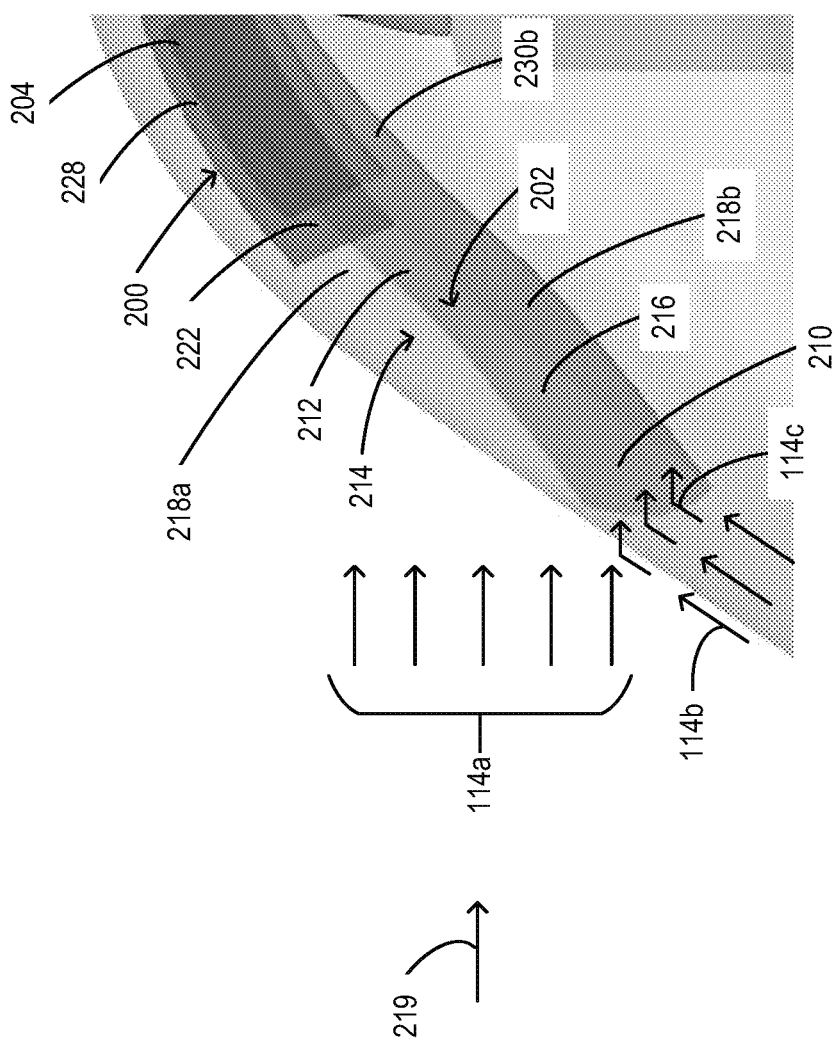
FIG. 3C is a detail side perspective semi-transparent view of the wind turbine system of FIG. 3B.

Referring to FIGS. 3A-3C, airflow capture inlet 202 may have any physical configuration suitable for capturing wind 114 striking body front portion 104 and directing that wind 114 as airflow downstream towards air driven rotor assembly 206. For example, airflow capture inlet 202 may define an opening to admit wind 114 and have a downstream end 212 to discharge the admitted wind as airflow towards air driven rotor assembly 206. In the illustrated example, airflow capture inlet 202 is formed as an open sided conduit. As shown, airflow capture inlet 202 has an open upper side that forms an air entry window 214, which extends from inlet upstream end 210 to inlet downstream end 212. This may permit airflow capture inlet 202 to capture a greater proportion of incoming wind 114 as compared to a close sided design with an opening only at inlet upstream end 210, all else being equal. As shown in the illustrated example, airflow capture inlet 202 may include a flow directing floor 216, a left sidewall 218a, and a right sidewall 218b to direct captured wind as airflow towards air driven rotor assembly 206. Left sidewall 218a and right sidewall 218b may each extend from flow directing floor 216 to air entry window 214 on the left and right sides, respectively, of airflow capture inlet 202. In the illustrated example, flow directing floor 216 and air entry window 214 form opposing sides of the open sided conduit of airflow capture inlet 202. In alternative embodiments, airflow capture inlet 202 may be formed as a closed sided conduit with an inlet opening only at upstream end 210.

Referring now to FIGS. 2A-2B, air entry window 214 may have any shape and/or configuration suitable for admitting wind 114 striking body front portion 104. For example, air entry window 214 may extend from inlet upstream end 210 (shown in FIG. 1A) to inlet downstream end 212 (shown in FIG. 1A) and may be characterized as having a forward projection 215, which is a projection of air entry window 214 onto a vertical plane as shown. The surface area of forward projection 215 is referred to as air entry window forward projection area 220 and represents the area of a vertical plane that is passed through by wind 114 which impacts vehicle 100 when vehicle 100 is moving forwards (assuming that the ambient air is still and the relative velocity of the air to vehicle 100 is determined by the forward movement of vehicle 100). Forward projection area 220 of air entry window 214 may be at least 5%, such as 5% to 75%, of forward projection area 106 of vehicle body 102. In the illustrated example, forward projection area 220 of air entry window 214 is at least 10% of forward projection area 106 of vehicle body 102. Lower value ranges within this range, such as 5% to 15% may occupy less of body front portion 104 of vehicle body 102 that may be required for other components of vehicle 100 such as openable doors, windows, and/or lights, for example. Higher value ranges within this range, such as 20% to 75%, may allow wind turbine system 200 to more efficiently capture airflow, which can result in higher power generation rates. In alternative embodiments, forward projection area 220 is less than 5% of forward projection area 106.

In some embodiments, air entry window 214 can be at least 50 centimeters wide, such as 50 centimeters to 150 centimeters measured from left sidewall 218a (shown in FIG. 1A) to right sidewall 218b (shown in FIG. 1A). Alternatively or in addition, air entry window 214 may be at least 75 centimeters, such as 75 centimeters to 175 centimeters long measured from inlet upstream end 210 (shown in FIG. 1A) to inlet downstream end 212 (shown in FIG. 1A). Values in these ranges may provide large vehicles with an air entry window 214 sized to receive a large portion of the oncoming wind. In the illustrated example, air entry window 214 is about 100 centimeters wide and about 135 centimeters long. Lower value ranges within these ranges, such as 50 centimeters to 75 centimeters wide and 75 centimeters to 100 centimeters long, may require less space at body front portion 104 of vehicle body 102 that may be required for other components of the vehicle 100, such as openable doors, windows, and/or lights, for example. Higher value ranges within these ranges, such as 125 centimeters to 150 centimeters wide and 150 centimeters to 175 centimeters long, may allow air entry window 214 to capture more wind 214 impacting body front portion 104 of vehicle 100.

Referring now to FIGS. 3A-3B, flow directing floor 216 may have any design suitable for efficiently directing captured wind downstream. For example, flow directing floor 216 may extend from inlet upstream end 210 to inlet downstream end 212. In the illustrated embodiment, flow directing floor 216 is sloped upwardly from inlet upstream end 210 to inlet downstream end 212. The upward slope may help mitigate the turbulence of the captured wind by providing a smooth and gradual transition to downstream portions of wind turbine system 200. In some example embodiments, such as the illustrated embodiment, at least a portion of flow directing floor 216 is concave. That is, the flow directing floor 216 has a concave curvature, which the captured airflow impacts. The concave curvature may help mitigate the turbulence of the captured wind by more effectively directing the captured wind towards flow consolidating conduit 204. In some example embodiments, such as the illustrated embodiment, air entry window 214 overlies flow directing floor 216. In alternative embodiments, flow directing floor 216 is not sloped upwardly. In alternative embodiments, flow directing floor 216 is not concave. In alternative embodiments, air entry window 214 does not overlie flow directing floor 216.

Referring still to FIGS. 3A-3B, flow consolidating conduit 204 can have any design suitable for directing airflow downstream. For example, flow consolidating conduit may extend from a consolidating conduit upstream end 222 to a consolidating conduit downstream end 224. In the illustrated example, consolidating conduit upstream end 222 is positioned at inlet downstream end 212. This may allow airflow from airflow capture inlet 202 to enter flow consolidating conduit 204 at consolidating conduit upstream end 222 and be discharged at consolidating conduit downstream end 224. In the illustrated example, flow consolidating conduit 204 is close sided. As shown, flow consolidating conduit 204 is enclosed on a lower portion by a conduit floor 226, an upper portion by a conduit ceiling 228, and side portions by left 230a and right 230b conduit sidewalls. Each of left and right conduit sidewalls 230 are contiguous with left and right sidewalls 218, respectively, of airflow capture inlet 202, as shown. The close sidedness of flow consolidating conduit 204 allows flow consolidating conduit to consolidate the airflow moving through the conduit, thereby providing a more laminar airflow (i.e. reduces turbulence and increases flow coherence).

Figure 4A:
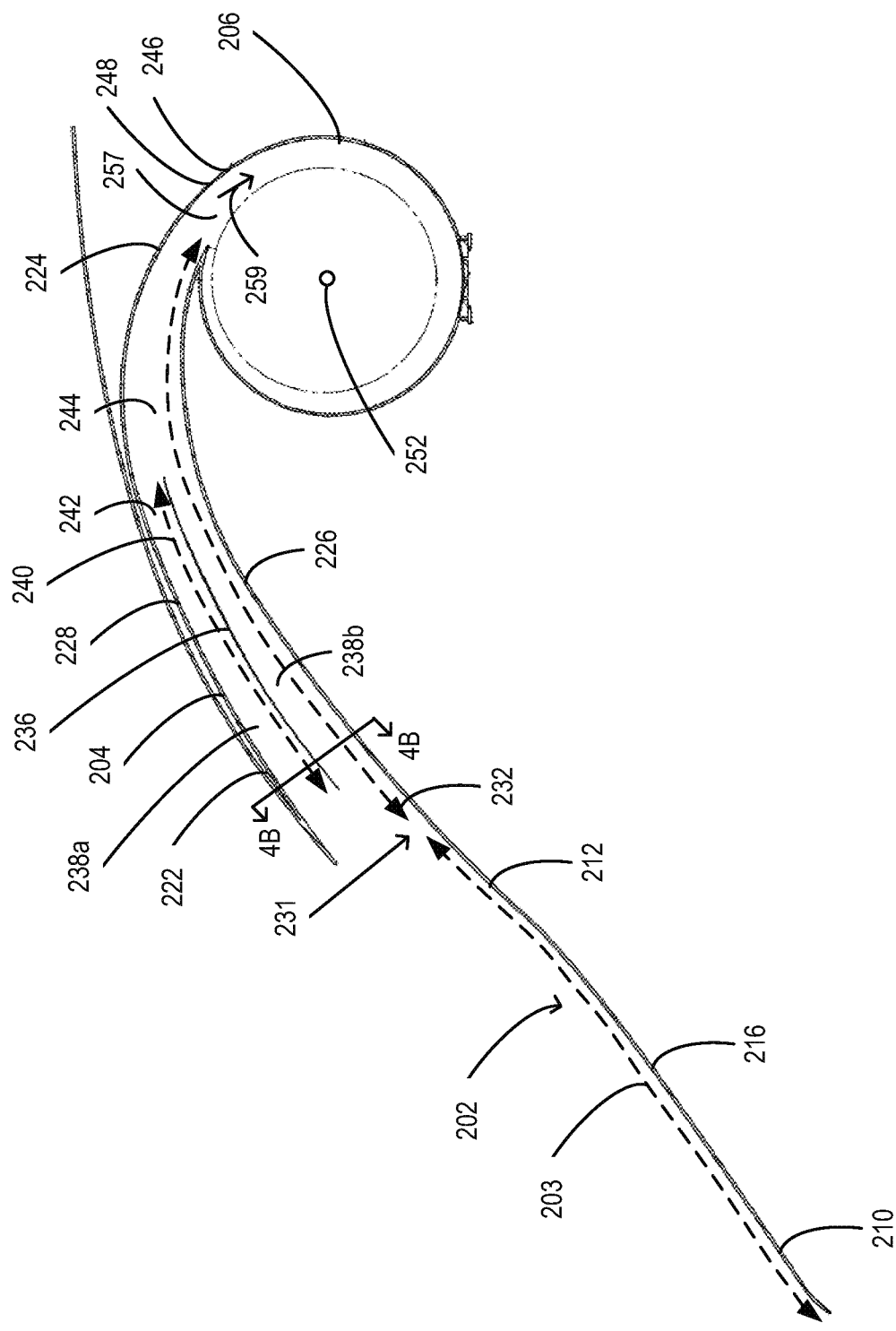
FIG. 4A is a side view schematic of a portion of the wind turbine system of FIG. 1.

Referring now to FIG. 4A, flow consolidating conduit 204 may have any length 232 suitable for efficiently consolidating airflow. For example, conduit length 232 can be at least 80 centimeters, such as 80 centimeters to 180 centimeters. Shorter conduit lengths 232, such as 80 centimeters to 110 centimeters may require less space within body front portion 104 (shown in FIG. 1A) of vehicle body 102 (shown in FIG. 1A) that may be required for other components of vehicle 100 (shown in FIG. 1A), such as openable doors, windows, and/or lights, for example. Longer conduit lengths 232, such as 150 centimeters to 180 centimeters may allow flow consolidating conduit 204 to more effectively consolidate airflow and/or reduce turbulence of the airflow and/or provide a more laminar airflow, at least due to the increased length of flow consolidating conduit 204.

Flow consolidating conduit 204 can have any conduit length 232 relative to a length 203 of airflow capture inlet 202 suitable for directing airflow between airflow capture inlet 202 and air driven rotor assembly 206. For example, conduit length 232 can be at least 50% of length 203 of airflow capture inlet 202, such as 50% to 250%. In the example illustrated, conduit length 232 is substantially the same length as (e.g., within 20% of) length 203 of airflow capture inlet 202. In alternative embodiments, conduit length 232 is less than 50% of length 203 of airflow capture inlet 202.

Figure 4B:
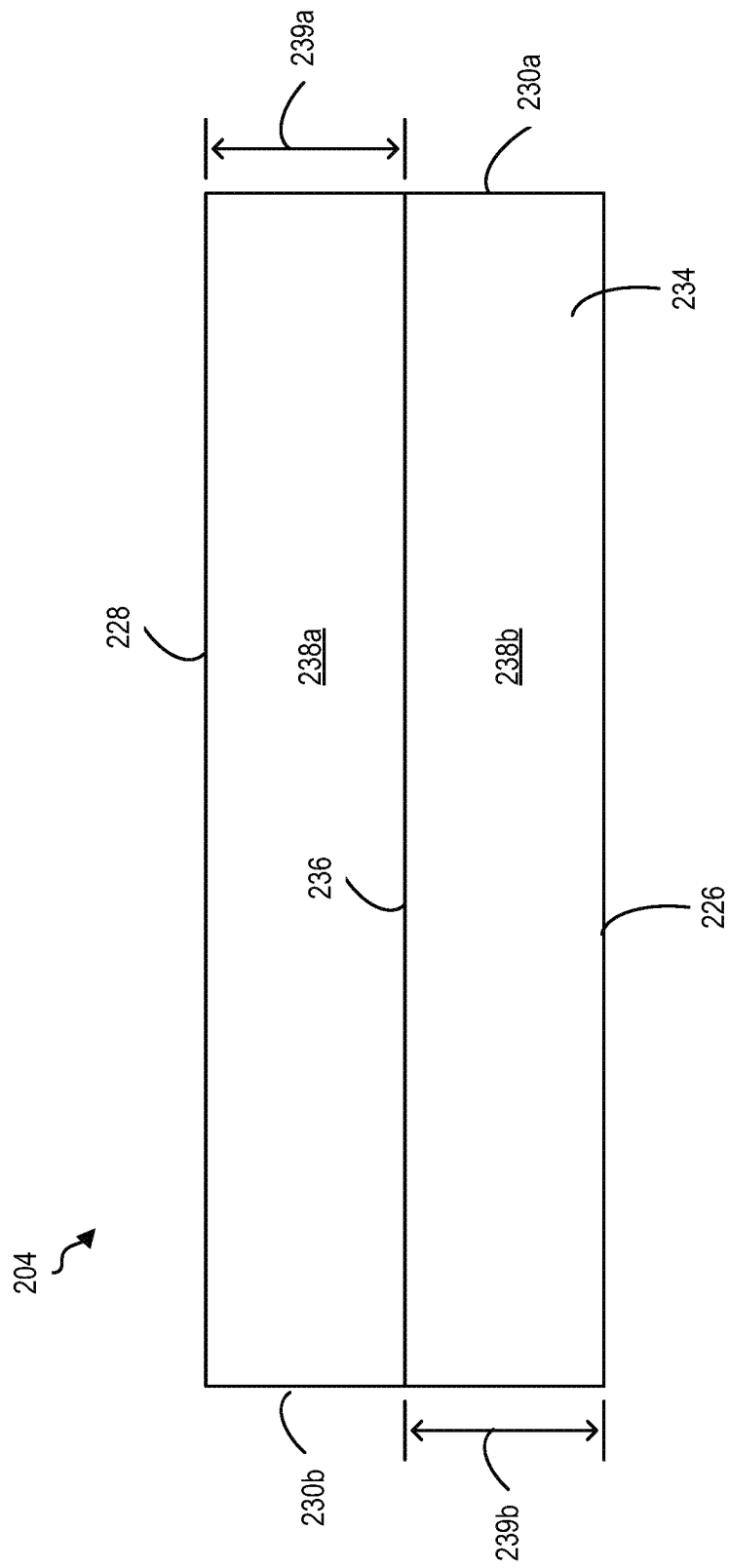
FIG. 4B is a cross-section taken along line 4B-4B in FIG. 4A.

Referring to FIGS. 4A-4B, flow consolidating conduit 204 may have any cross-sectional area 234 suitable for supporting the flow of consolidated airflow downstream. Cross-sectional area 234 of flow consolidating conduit 204 is the area of flow consolidating conduit 204 along a cross-sectional plane (e.g., plane 4B-4B) that extends perpendicularly to the downstream flow direction. Referring now to FIG. 4A, as shown, cross-sectional area 234 may decrease between consolidating conduit upstream end 222 and consolidating conduit downstream end 224 toward consolidation conduit downstream end 224. For example, in the illustrated embodiment, a separation distance between conduit floor 226 and conduit ceiling 228 decreases between consolidating conduit upstream end 222 and consolidating conduit downstream end 224 toward consolidating conduit downstream end 224. In some example embodiments, cross-sectional area 234 decreases by at least 30%, such as 30% to 90%. Larger decreases in cross-sectional area 234, such as 70% to 90%, can result in higher speeds of the airflow at consolidating conduit downstream end 224. In alternative embodiments, cross-sectional area 234 does not decrease along conduit length 232.

Cross-sectional area 234 may decrease between consolidating conduit upstream end 222 and consolidating conduit downstream end 224 toward consolidating conduit downstream end 224 in any manner suitable to accelerate the flow exiting from consolidating conduit downstream end 224. For example, cross-sectional area 234 may decrease across the entirety of conduit length 232 or only a portion, and may decrease continuously or in a stepwise manner. Referring still to FIG. 4A, in the illustrated example, cross-sectional area 234 decreases across the entirety of conduit length 232 in a continuous manner. This may avoid introduction of additional turbulence to the airflow by allowing for a gradual decrease in cross-sectional area 234.

Referring to FIGS. 2A, 4A, and 4B, in some embodiments the design of air entry window 214 provides a forward projection area 220 that is substantially larger than cross-sectional area 234 of consolidating conduit upstream end 222. Accordingly, air entry window 214 may capture a large volume of airflow for downstream delivery to consolidating conduit 204. For example, forward projection area 220 may be at least 2 times cross-sectional area 234 (e.g. 2 to 50 times cross-sectional area 234, such as at least 4 times cross-sectional area 234). In alternative embodiments, forward projection area 220 is less than 2 times cross-sectional area 234. For example, forward projection area 220 may be less than cross-sectional area 234.

Referring to FIG. 4A, flow consolidating conduit 204 may have a floor of any design suitable for directing airflow downstream. For example, flow consolidating conduit 204 may include a conduit floor 226 that directs airflow through flow consolidating conduit 204. In the illustrated example, conduit floor 226 is contiguous with flow directing floor 216, where conduit floor 226 and flow directing floor 216 meet at a contiguity position 231. As shown, the conduit floor 226 is convex. Accordingly, in some example embodiments, concave flow directing floor 216 inflects to convex conduit floor 226 at contiguity position 231. In some embodiments, the position of inflection from the concave floor to the convex floor is at a position that is separate from contiguity position 231. For example, in some embodiments such as the illustrated embodiment, the position of inflection is upstream of contiguity position 231, such that flow directing floor 216 includes a concave portion and a convex portion. In other embodiments, the position of inflection is downstream of contiguity position 231, such that conduit floor 226 includes a concave portion and a convex portion. In alternative embodiments, conduit floor 226 is not convex.

Flow consolidating conduit 204 may have any design suitable for efficiently reducing turbulence of the airflow (e.g., increasing flow coherence) before the airflow reaches air driven rotor assembly 206. For example, flow consolidating conduit 204 may include one or more flow partitions 236 that partition the airflow into airflows having smaller cross-sectional areas. Flow consolidating conduit 204 may have any number of flow partitions 236, such as 1-20 flow partitions. In the illustrated example, flow consolidating conduit 204 is shown having one flow partition 236 extending between consolidating conduit upstream end 222 and consolidating conduit downstream end 224 and partitioning airflow into flow discrete airflow paths 238a and 238b. This may more efficiently reduce the turbulence in each individual flow path 238 (e.g., increases flow coherence in each individual flow path 238) before the flow paths 238 are merged downstream of flow partition 236.

Referring still to FIG. 4A, flow partitions 236 may have any design suitable for efficiently partitioning airflow. For example, flow partitions 236 may extend between consolidating conduit upstream end 222 and consolidating conduit downstream end 224 and from left conduit sidewall 230a to right conduit sidewall 230b, subdividing cross-sectional area 234 of flow consolidating conduit 204 into two or more flow paths 238. In the illustrated example, flow partition 236 has adjacent upper flow path 238a and adjacent lower flow path 238b. As shown, each flow path 238 extends between consolidating conduit upstream end 222 and consolidating conduit downstream end 224. In the illustrated example, flow partition 236 has a partition length 240 and a partition downstream end 242 located upstream of consolidating conduit downstream end 224. In the illustrated example, flow partition 236 has a convex curvature substantially parallel to convex conduit floor 226. In alternative embodiments, flow partition 236 does not have a curvature resembling the curvature of conduit floor 226. Alternative embodiments may have no flow partitions 236.

Each flow partition 236 may have any thickness suitable for efficiently partitioning airflow. For example, flow partition 236 can have a thickness of at least 5 millimeters, such as 5 millimeters to 15 millimeters. Thinner flow partitions 236, such as 5 millimeters to 10 millimeters, may require less material to manufacture and may allow more flow partitions 236 to be positioned in flow consolidating conduit 204. Thicker flow partitions 236, such as 10 millimeters to 15 millimeters, may be sturdier for subdividing the airflow, particularly when vehicle 100 is travelling at high speeds and accordingly, wind 114 (shown in FIG. 2A) is captured by wind turbine system 200 at high speeds. In alternative embodiments, one or more (or all) of flow partitions 236 may have a thickness less than 5 millimeters or greater than 15 millimeters.

Figure 4C:
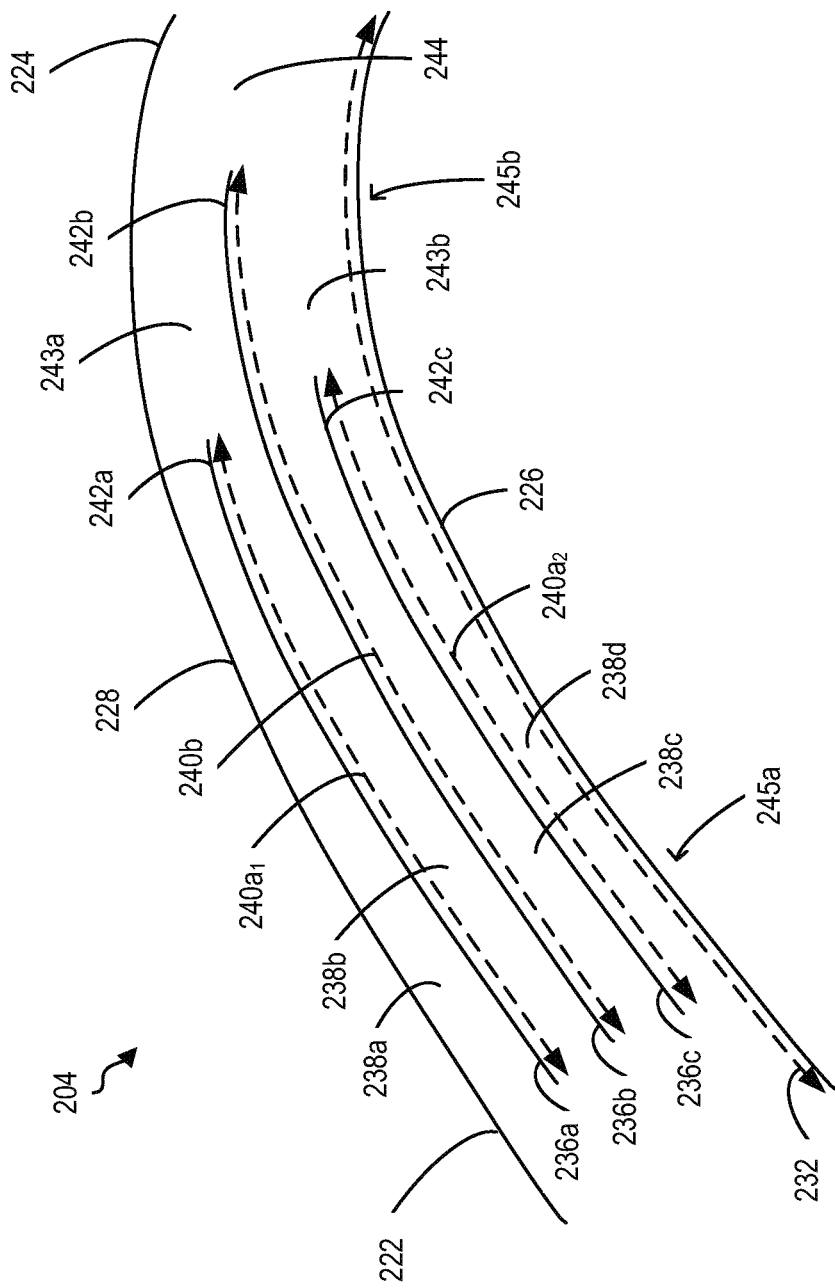
FIG. 4C is a detail side view schematic of a portion of the wind turbine system of FIG. 4A in accordance with another embodiment.

Referring now to FIG. 4C, flow partitions 236 may have any dimensional arrangement suitable for efficiently partitioning airflow into flow paths 238. For example, flow partitions 236 may include a plurality of flow partitions. In the illustrated embodiment, flow partitions 236 includes three flow partitions 236a-c subdividing flow consolidating conduit 204 into four flow paths 238a-d. As shown, partition length 240 of flow partitions 236a-c is different from partition length 240 of at least one other flow partition 236a-c. That is, flow partitions 236a and 236c each have partition length 240a, which is different from partition length 240b of flow partition 236b. In some embodiments, partition length 240 may be less than 90% or greater than 110% of partition length 240 of at least one other flow partition 236, such as 50% to 90% or 110% to 150% of partition length 240 of at least one other flow partition 236. In the illustrated embodiment, each partition downstream end 242 is differently positioned along conduit length 232 than at least one other partition downstream end 242. That is, partition downstream ends 242a and 242c of flow partitions 236a and 236c, respectively are positioned differently along conduit length 232 than partition downstream end 242b of flow partition 236b. As shown, the number of flow partitions 236 present at a position along flow consolidating conduit 204 may decrease downstream (i.e. towards consolidating conduit downstream end 224). For example, at position 245a, there are three flow partitions 236a-c, whereas at position 245b, which is downstream of position 245a, there is one flow partition 236b. In alternative embodiments, flow partitions 236 each have the same partition length 240. In alternative embodiments, each partition downstream end 242 is positioned similarly along conduit length 232. In alternative embodiments, the number of flow partitions 236 located at a position 245 along flow consolidating conduit 204 is not decreasing towards consolidating conduit downstream end 224.

Referring to FIGS. 4A and 4C, flow paths 238 may merge in any manner suitable for consolidating the downstream airflow. For example, each flow path 238 adjacent a flow partition 236 may merge into a merged flow path 244 at partition downstream end 242. Referring to FIG. 4A, the illustrated example shows each flow path 238a-b adjacent flow partition 236 merging into merged flow path 244 at partition downstream end 242. Referring now to FIG. 4C, the illustrated example shows flow path 238a and flow path 238b, each adjacent to flow partition 236a, merging into an intermediate merged flow path 243a at partition downstream end 242a. Similarly, flow path 238c and flow path 238d, each adjacent to flow partition 236c, merge into intermediate merged flow path 243b at partition downstream end 242c. Intermediate merged flow path 243a and intermediate merged flow path 243b, each adjacent to flow partition 236b, merge into merged flow path 244 at partition downstream end 242b. In alternative embodiments, there may be no partitions 236 or there may be more than two flow partitions 236.

Referring to FIG. 4B, flow paths 238 may have any height 239 suitable for efficiently allowing airflow downstream. For example, flow paths may have a height 239 defined by the distance between adjacent flow partitions 236, or between flow partition 236 and conduit floor 226, or between flow partition 236 and conduit ceiling 228, depending on where flow partition 236 is positioned. In the illustrated example, flow path 238a has height 239a defined by the distance between flow partition 236 and conduit ceiling 228, and flow path 238b has height 239b defined by the distance between flow partition 236 and conduit floor 226. As shown, heights 239a-b are substantially equal. The term "substantially equal" can mean, for example, 80% to 120% of the height of other flow paths 238. In alternative embodiments, flow paths 238 may not have substantially equal heights (e.g. flow paths 238 may be less than 80% or greater than 120% of height of each other flow path 238).

Referring now to FIG. 4A, air driven rotor assembly 206 can have any design suitable for driving a rotor with airflow from flow consolidating conduit 204 and discharging the airflow downstream.

As shown, air driven rotor assembly 206 may include an upper portion 246 having a rotor assembly upstream end 248. In the illustrated example, consolidating conduit downstream end 224 is joined to upper portion 246 of air driven rotor assembly 206. As shown, rotor assembly upstream end 248 is located downstream of consolidating conduit downstream end 224. This may allow consolidated airflow from flow consolidating conduit 204 to transition smoothly to at upper portion 246 of air driven rotor assembly 206, such as at rotor assembly upstream end 248.

Referring still to FIG. 4A, air driven rotor assembly 206 can be positioned in any manner relative to consolidating conduit downstream end 224 suitable for receiving airflow from flow consolidating conduit 204. For example, consolidating conduit downstream end 224 may be positioned at an elevation above or below air driven rotor assembly 206. In the illustrated example, consolidating conduit downstream end 224 is positioned at an elevation above air driven rotor assembly 206 and offset from a central portion of air driven rotor assembly 206 defined by a rotation axis 252 of air driven rotor 250. This may permit the airflow, which moves upwardly through flow consolidating conduit 204 to transition smoothly into air driven rotor assembly 206 with little or no added turbulence. As shown, consolidating conduit downstream end 224 is positioned and oriented to provide a discharge path into air driven rotor assembly 206 that is tangential to the airflow rotation within air driven rotor assembly 206. In other example embodiments, consolidating conduit downstream end 224 is positioned at an elevation above the air driven rotor assembly 206 and in general alignment with a central portion of air driven rotor assembly 206. In alternative embodiments, consolidating conduit downstream end 224 is not positioned at an elevation above air driven rotor assembly 206.

Figure 5:
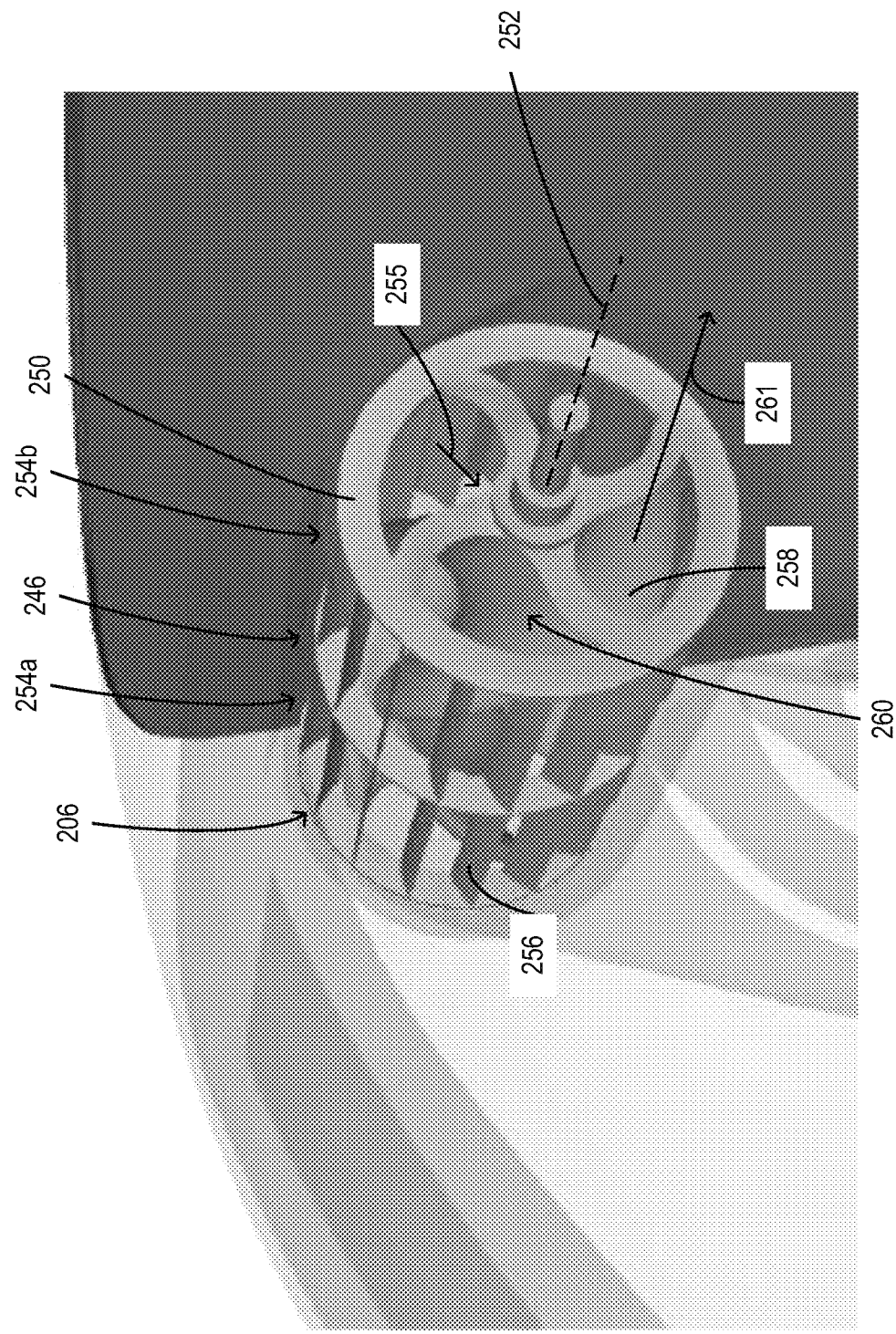
FIG. 5 is a side perspective semi-transparent view of a portion of the wind turbine system of FIG. 1.

Referring now to FIG. 5, air driven rotor 250 may have a rotation axis oriented in any suitable direction. As shown, air driven rotor 250 may extend parallel to the rotation axis from a first air driven rotor end 254a to a second air driven rotor end 254b. In the illustrated example, rotation axis 252 extends laterally relative to vehicle 100 (shown in FIG. 1A) and is the axis around which air driven rotor 250 rotates. That is, air driven rotor 250 is oriented in a substantially horizontal orientation. For example, air driven rotor 250 may be oriented within 30 degrees of horizontal (i.e., within 30 degrees of perpendicular to the direction of gravity) when vehicle 100 is situated on a flat horizontal surface.

Referring to FIGS. 5 and 6A, air driven rotor 250 may have any design suitable for rotating by airflow. For example, air driven rotor 250 may include a plurality of air driven blades 256. In the example shown, each air driven blade 256 extends laterally in a direction parallel to rotation axis 252 and is positioned around the periphery of air driven rotor 250. Air driven blades 256 may interact with airflow to drive air driven rotor 250. Each air driven blade 256 may have a radially inward discharge direction 255. That is, airflow that interacts with each air driven blade 256 may be discharged radially inwardly, in the general direction of rotation axis 252. This may allow airflow to be redirected and discharged from air driven rotor 250 at air driven rotor ends 254. In alternative embodiments, air driven blades 256 are not positioned around the periphery of air driven rotor 250.

Referring now to FIG. 5, air driven rotor 250 may have any design suitable for redirecting airflow. For example, air driven rotor 250 may include one or more air redirecting blades 258 and one or more flow discharge windows 260 at air driven rotor ends 254. In the example illustrated, air redirecting blades 258 are located radially inward of air driven blades 256. That is, as shown, air redirecting blades 258 are located closer to rotation axis 252 than air driven blades 256. Air redirecting blades 258 may have an axial discharge direction 261. In the example illustrated, the axial discharge direction 261 is substantially parallel to rotation axis 252. The term "substantially parallel" as used herein can mean, for example, within 30 degrees of parallel. Accordingly, air redirecting blades 258 may redirect airflow to be laterally discharged from air driven rotor 250 through flow discharge windows 260. This may allow the airflow to be discharged from wind turbine system 200 at lateral sides 109 (shown in FIG. 1A) of vehicle 100 (shown in FIG. 1A).

Referring now to FIG. 6B, air redirecting blades 258 can have any design suitable for redirecting airflow. For example, air redirecting blades 258 can have a herringbone shape. In the example illustrated, air redirecting blades 258 include a first portion 262a and a second portion 262b forming the herringbone shape. As shown, first and second portions 262 can be angled 264. In some embodiments, angle 264 can be at least 25 degrees, such as 25 degrees to 30 degrees, from an axis 266 parallel to rotation axis 252 (shown in FIG. 5). In alternative embodiments, air redirecting blades 258 do not have a herringbone shape. Alternative embodiments may have no air redirecting blades 258.

Referring to FIG. 3B, wind turbine system 200 may have any structure suitable for discharging airflow downstream of air driven rotor 250. For example, wind turbine system 200 may include one or more redirecting exhaust outlets 268 through which the airflow can be discharged from wind turbine system 200. As exemplified, redirecting exhaust outlets 268 may be downstream of flow discharge windows 260. As shown, redirecting exhaust outlets 268 may be positioned along lateral side 109 of vehicle 100 and shaped to discharge the exiting air substantially rearwardly. This may reduce or eliminate vehicle drag resulting from the discharging airflow. In alternative embodiments, there may be no redirecting exhaust outlets 268. In alternative embodiments, redirecting exhaust outlets 268 may not be positioned along lateral sides 109 of vehicle 100.

Figure 7:
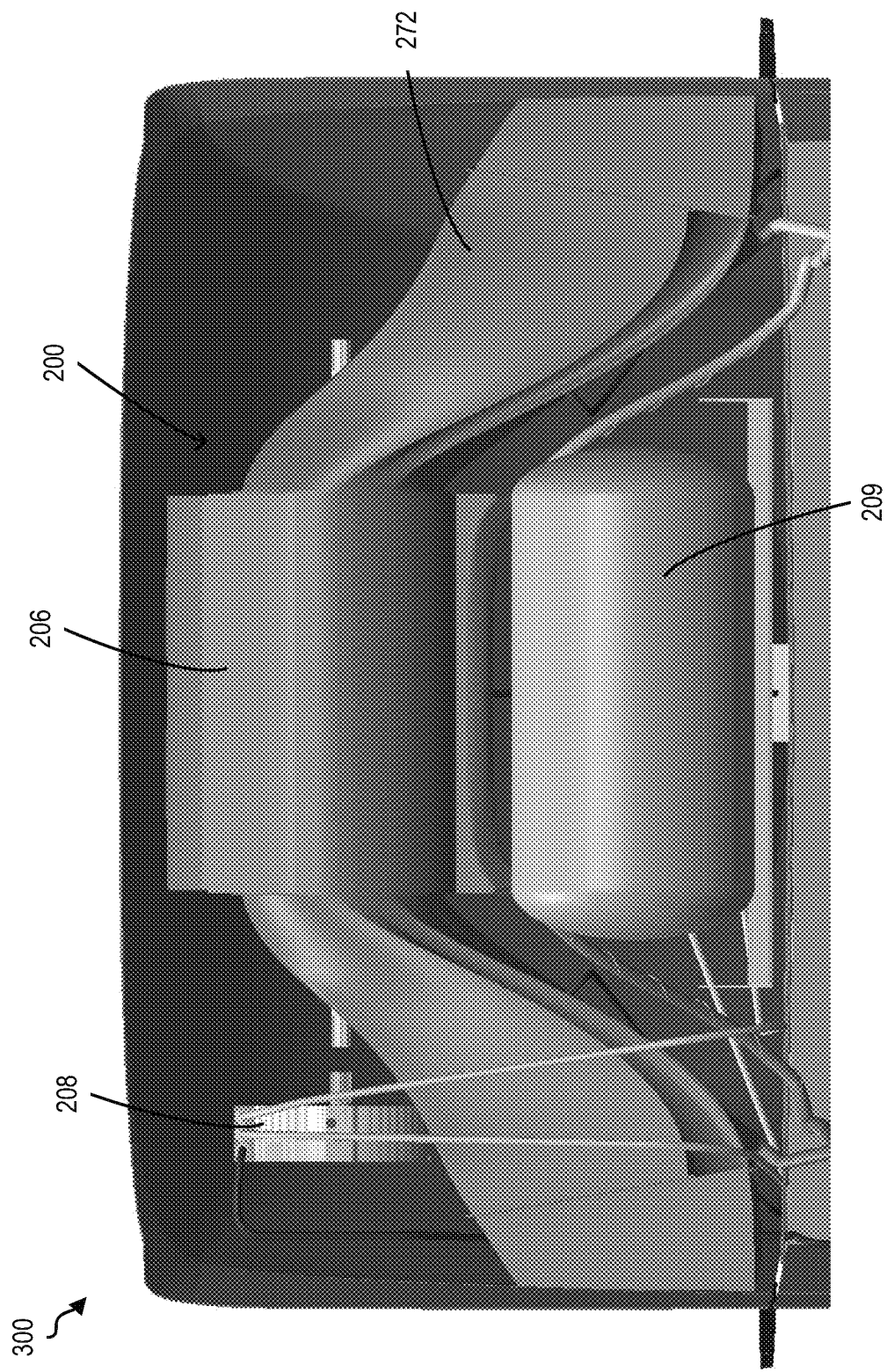
FIG. 7 is a rear view of a portion of the wind turbine system of FIG. 1 including a generator.

Referring now to FIG. 7, wind turbine system 200 may have any components suitable for generating electricity from the air driven activation of air driven rotor assembly 206. For example, wind turbine system 200 may include electric generator 208 (e.g., an axial flux generator) mechanically connected to air driven rotor 250. In the example illustrated, electric generator 208 is positioned at an elevation substantially similar to the elevation of air driven rotor assembly 206 (e.g., axially inline with air driven rotor assembly 206). However, the position of electric generator 208 is not so limited and can be positioned differently relative to air driven rotor assembly 206. As shown, electric generator 208 may be positioned adjacent air driven rotor assembly 206. For example, in alternative embodiments, electric generator 208 can be positioned inside wind deflector 300 with air driven rotor assembly 206. Electric generator 208 may generate electricity when air driven rotor 250 is driven by airflow. As shown, wind turbine system 200 may include a coolant tank 209 for generator 208. In alternative embodiments, there is no electric generator 208. In alternative embodiments, there is no coolant tank 209.

Referring now to FIG. 8, vehicle 100 may have any design suitable for storing energy generated by system 200. For example, vehicle 100 may include an energy storage member 270 electrically connected to electric generator 208. In the example illustrated, energy storage member 270 is electrically connected to supply energy to two electric motors 112, which can drive connected wheels 110. Electric motor 112 can be connected to any suitable vehicle component. Energy storage member 270 can be any suitable energy storage component for a vehicle, such as an electric vehicle. For example, in some embodiments, energy storage member 270 is an electric vehicle battery. In some embodiments, energy storage member 270 can include one or more discrete batteries (e.g., a large lead acid battery), or an array of battery cells (e.g., 1865 or 4680 lithium battery cells). Energy storage member 270 may be connected to any number of electric motors. Wind turbine system 200 may supply energy to energy storage member 270, which may increase the range of vehicle 100 and thereby mitigate the vehicle operator's range anxiety. In alternative embodiments, energy storage member 270 may not be connected to any electric motors 112. Alternative embodiments may not have energy storage member 270.

Figure 9A:
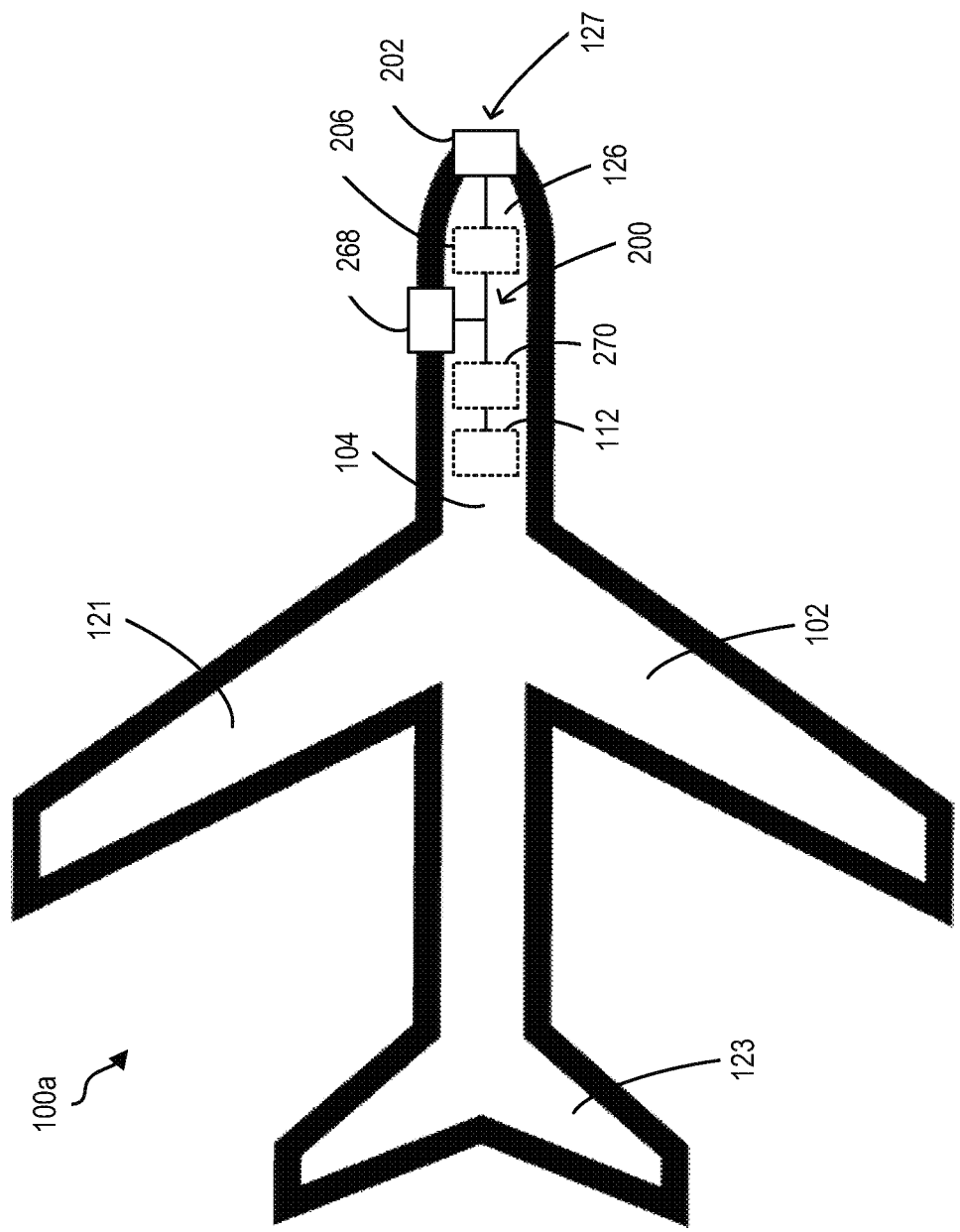
FIG. 9A is a schematic of an aircraft with the wind turbine system of FIG. 1.
Figure 9B:
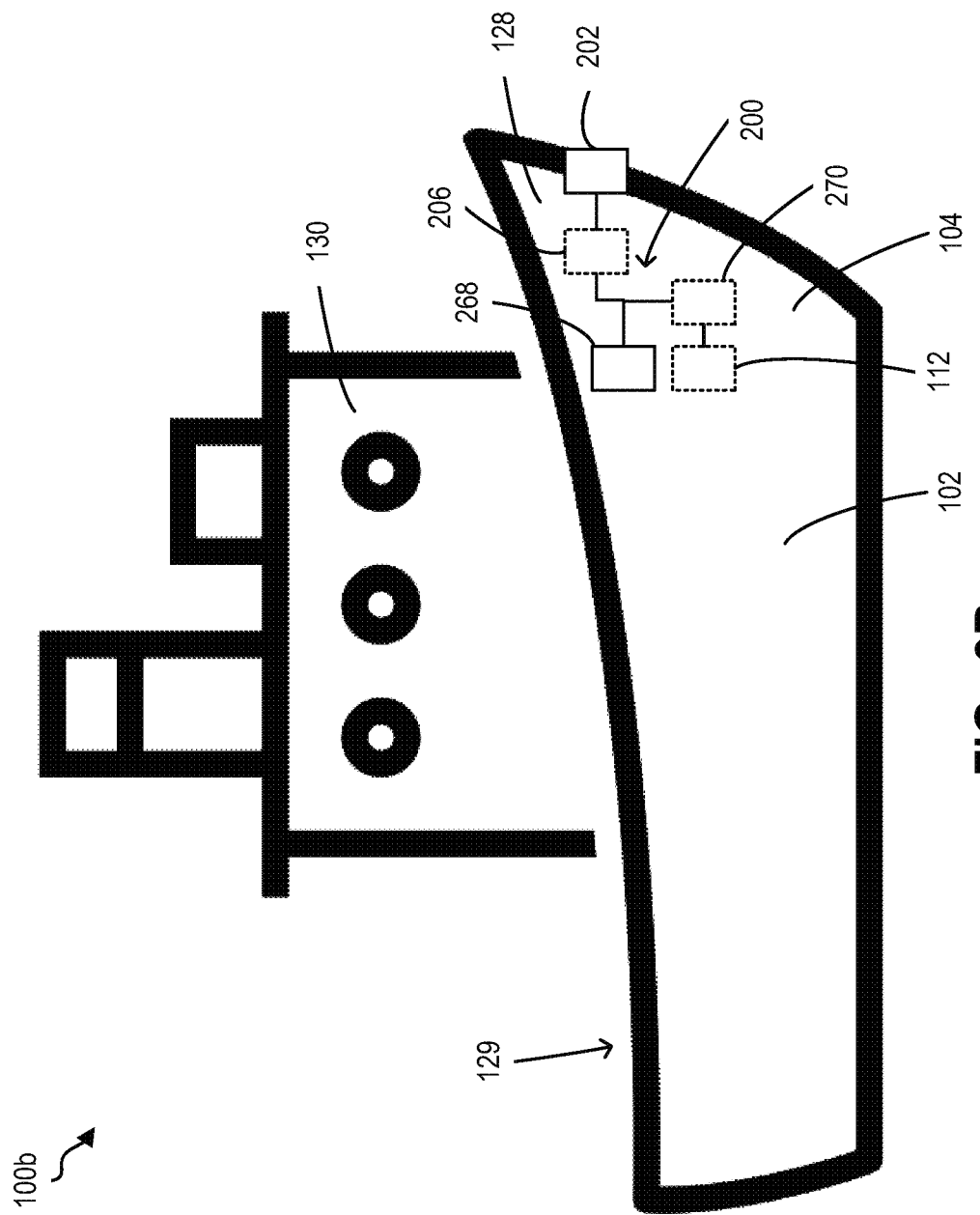
FIG. 9B is a schematic of a watercraft with the wind turbine system of FIG. 1.
Figure 9C:
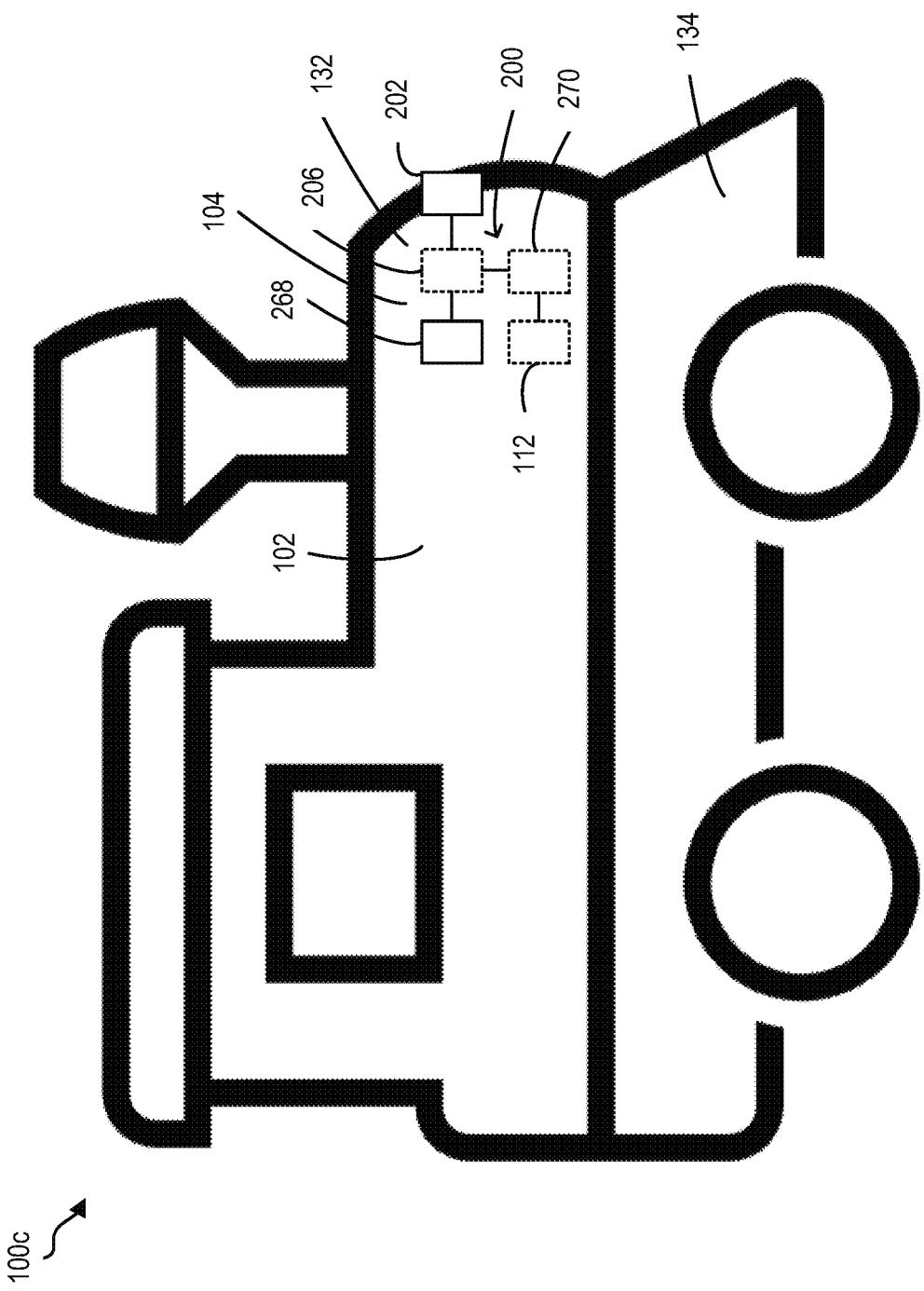
FIG. 9C is a schematic of a rail transport vehicle with the wind turbine system of FIG. 1.
Figure 9D:
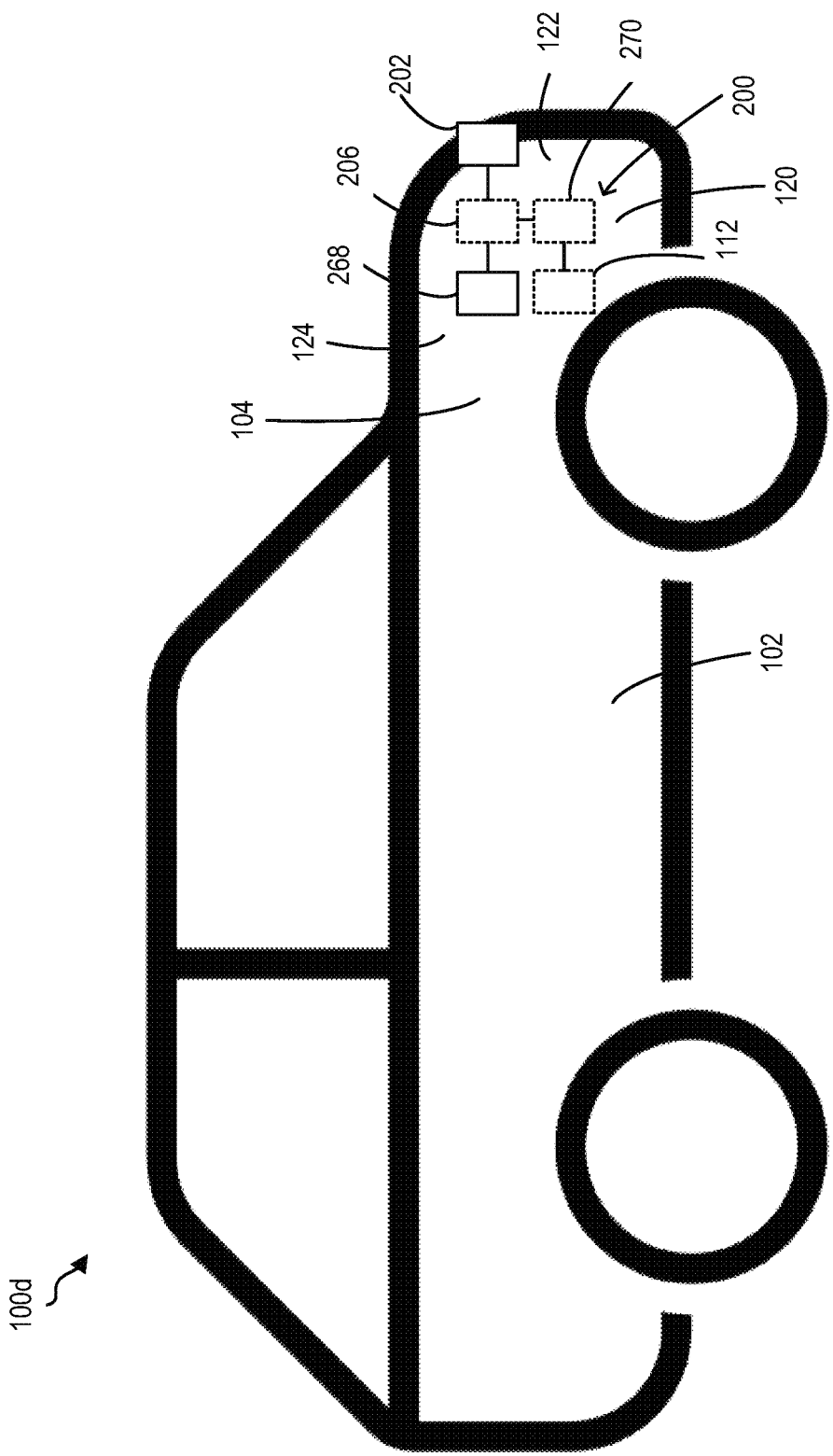
FIG. 9D is a schematic of an automobile with the wind turbine system of FIG. 1.
Figure 9E:
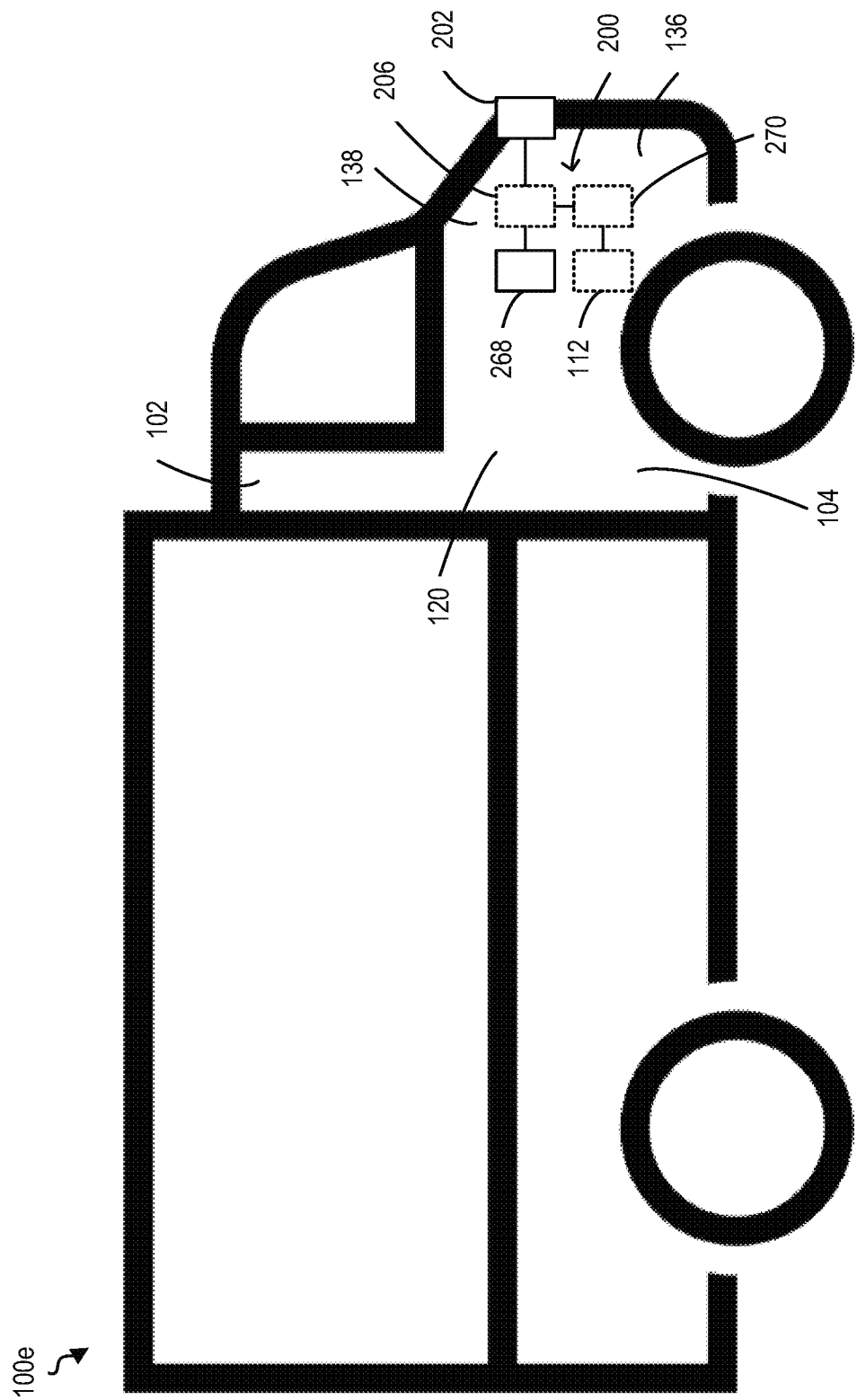
FIG. 9E is a schematic of a truck with the wind turbine system of FIG. 1.
Figure 9F:
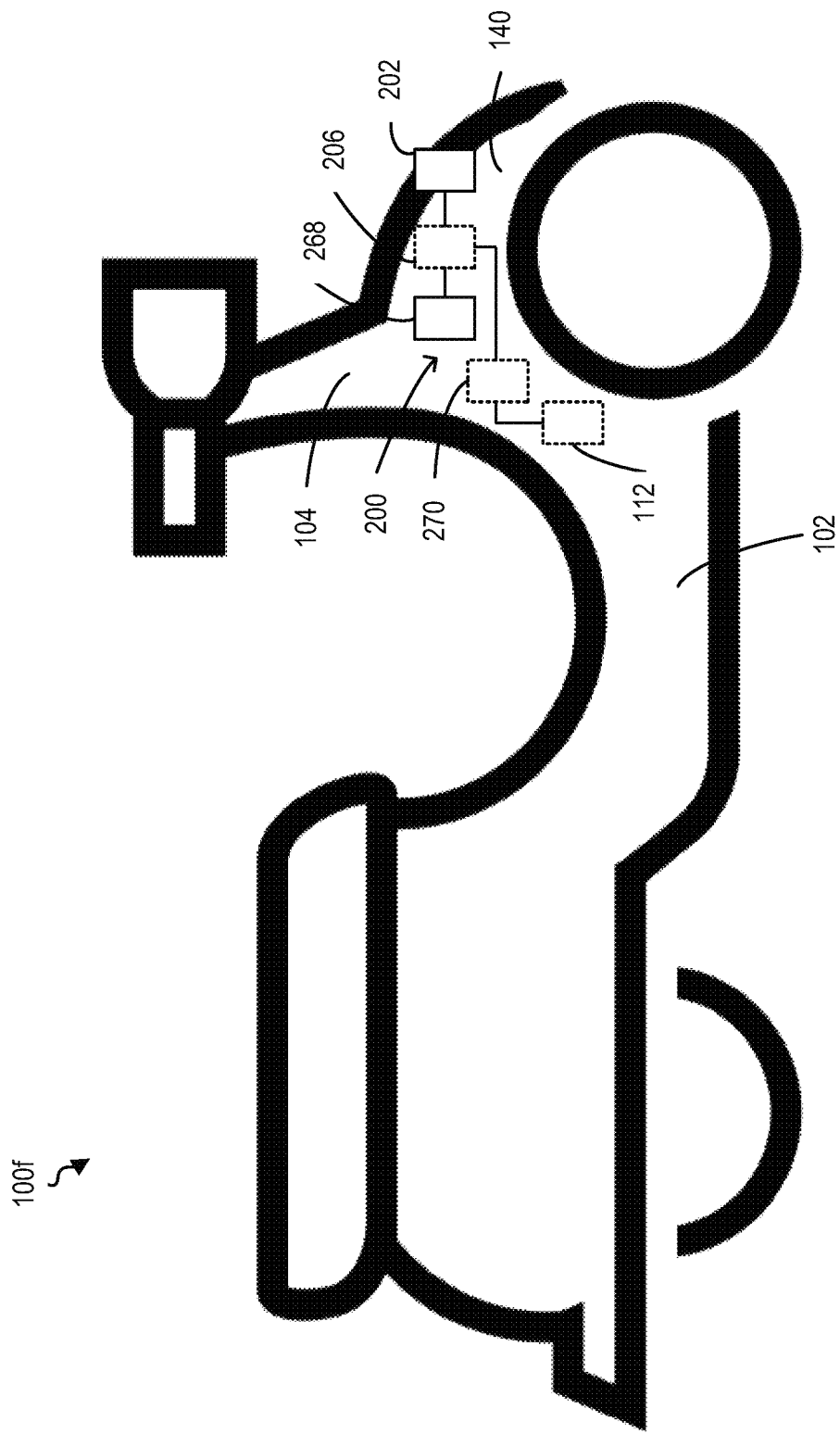
FIG. 9F is a schematic of a motorcycle with the wind turbine system of FIG. 1.

Referring now to FIGS. 9A-9F, vehicle 100 may be any type of vehicle suitable for including wind turbine system 200. For example, vehicle 100 (shown in FIG. 1) can include an aircraft 100a, a watercraft 100b, a rail transport vehicle 100c, an automobile 100d, a truck 100e, or a motorcycle 100f. Referring to FIG. 9A, shown therein is a schematic of aircraft 100a with wind turbine system 200. In the example illustrated, airflow capture inlet 202 is positioned proximate a nose 126 of vehicle body 102. Specifically, in this example, airflow capture inlet 202 is shown formed in a nose cone 127 of front portion 104. In other embodiments, airflow capture inlet 202 can be positioned proximate a wing 121 and/or a tail 123 of aircraft 100a. Aircraft 100a can include, for example, a passenger airplane, a cargo airplane, a military airplane, an airship, or any other suitable aircraft. Referring to FIG. 9B, shown therein is a schematic of watercraft 100b with wind turbine system 200. In the example illustrated, airflow capture inlet 202 is positioned proximate a bow 128 of vehicle body 102. In other embodiments, airflow capture inlet 202 can be positioned proximate a cockpit 130 of watercraft 100b. In other embodiments, airflow capture inlet 202 can be positioned proximate any structure above a deck 129 of watercraft 100b. Watercraft 100b can include a boat, a ship, a vessel, a yacht, or any other suitable watercraft. Referring to FIG. 9C, shown therein is a schematic of rail transport vehicle 100c (e.g. a train) with wind turbine system 200. In the example illustrated, airflow capture inlet 202 is formed in a main frame 132 of front portion 104. In other embodiments, airflow capture inlet 202 can be positioned proximate a pilot 134 of rail transport vehicle 100c. Rail transport vehicle 100c can include a locomotive, a train, a tram, a maglev, or any other suitable rail transport vehicle. Referring to FIG. 9D, shown therein is a schematic of automobile 100d with wind turbine system 200. In the example illustrated, airflow capture inlet 202 is positioned proximate lower end 120 of vehicle body 102. In this example, airflow capture inlet 202 is shown formed in one or both of front bumper 122 and hood 124 of front portion 104. Automobile 100d can include a passenger car, an ambulance, a bus, a multi-purpose vehicle, a limousine, a recreational vehicle or any other suitable automobile. Referring to FIG. 9E, shown therein is a schematic of truck 100e with wind turbine system 200. In the example illustrated, airflow capture inlet 202 is positioned proximate lower end 120 of vehicle body 102. In this example, airflow capture inlet 202 is shown formed in one or both of front bumper 136 and hood 138 of front portion 104. Truck 100e can include a tractor unit, a semi-trailer, a dump truck, a flatbed truck, a tanker, a box truck, a firetruck, or any other suitable truck. Referring to FIG. 9F, shown therein is a schematic of a motorcycle 100f with wind turbine system 200. In the example illustrated, airflow capture inlet 202 is positioned proximate a fender 140 of front portion 104. Motorcycle 100f can include motorbike, a scooter, a moped, a motor trike, or any other suitable motorcycle.

Figure 10A:
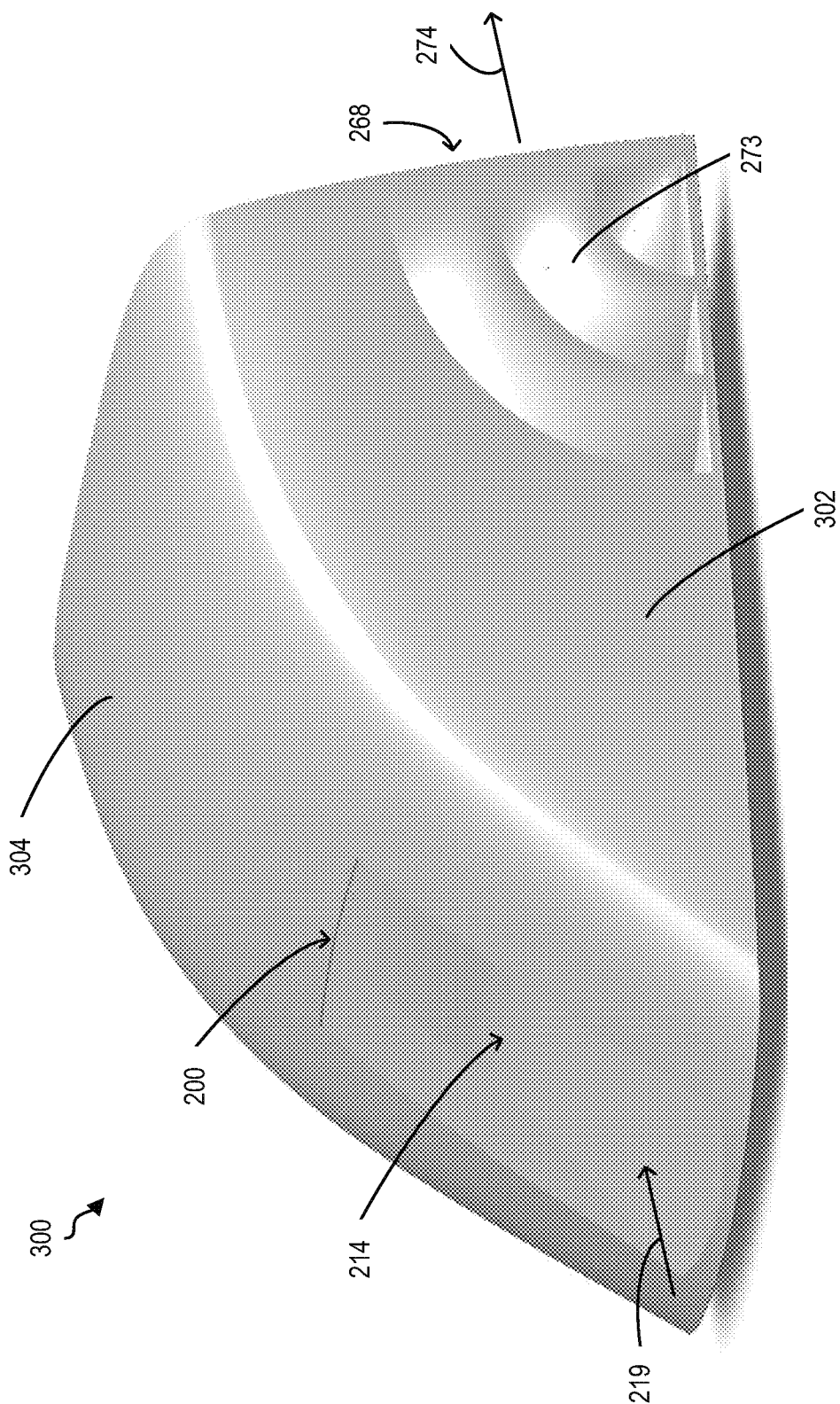
FIG. 10A is a side perspective view of an example wind deflector including the wind turbine system of FIG. 1.
Figure 10B:
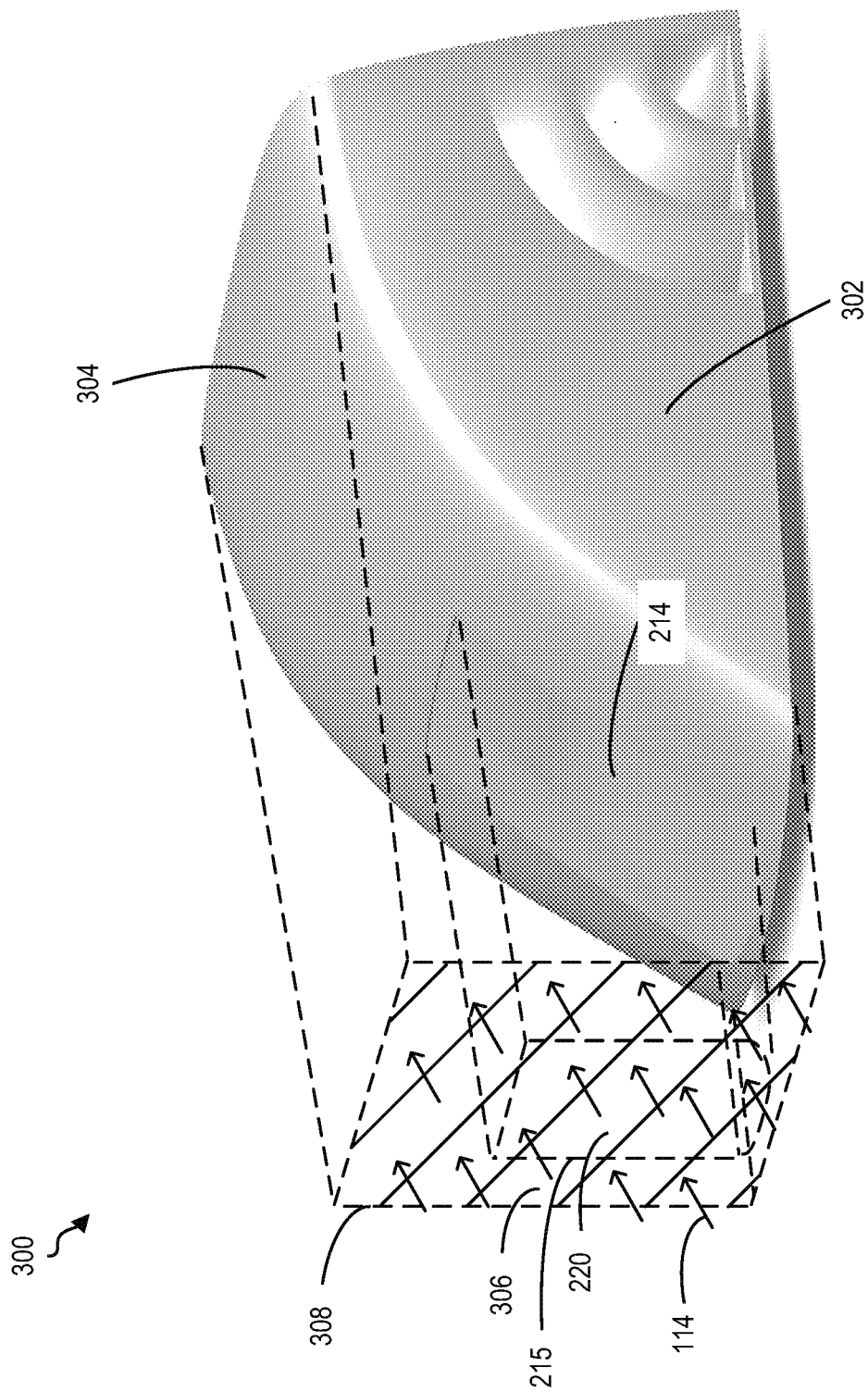
FIG. 10B is a side perspective view of the wind deflector of FIG. 10A showing a forward projection of a wind deflector body of the wind deflector and a forward projection of a window portion of the wind turbine system of FIG. 1.

Referring now to FIG. 10A, shown therein is wind deflector 300. Wind deflector 300 can be securable above a tractor unit. For example, in some embodiments, the wind deflector 300 can be securable above a cab portion of a tractor unit. As shown, wind deflector 300 includes a wind deflector body 302. Wind deflector body 302 includes a front portion 304 and wind turbine system 200. Referring to FIG. 10B, as shown, front portion 304 includes at least the portions of wind deflector body 302 which are impacted by wind 114 when the tractor unit to which wind deflector 300 may be secured is travelling forwards. Wind deflector body 302 may be characterized has having a forward projection 308, which is a projection of front portion 304 forwardly onto a vertical plane as shown. The surface area of forward projection 308 is referred to as forward projection area 306 and represents the area of a vertical plane that is passed through by wind 114 which impacts wind deflector 300. In some examples, forward projection area 220 of air entry window 214 is at least 25%, such as 25% to 75% of forward projection area 306 of wind deflector body 302. Lower values within this range, such as 25% to 50% may occupy less of front portion 304 of wind deflector body 302 that may be required for other components of wind deflector 300 such as other systems and/or structures of the tractor unit that may be stored in wind deflector 300, for example. Higher value ranges within this range, such as 50% to 75%, may allow wind turbine system 200 to more efficiently capture airflow, which can result in higher power generation. In alternative embodiments, forward projection area 220 of air entry window 214 is less than 25% of forward projection area 306 of wind deflector body 302.

Figure 11:
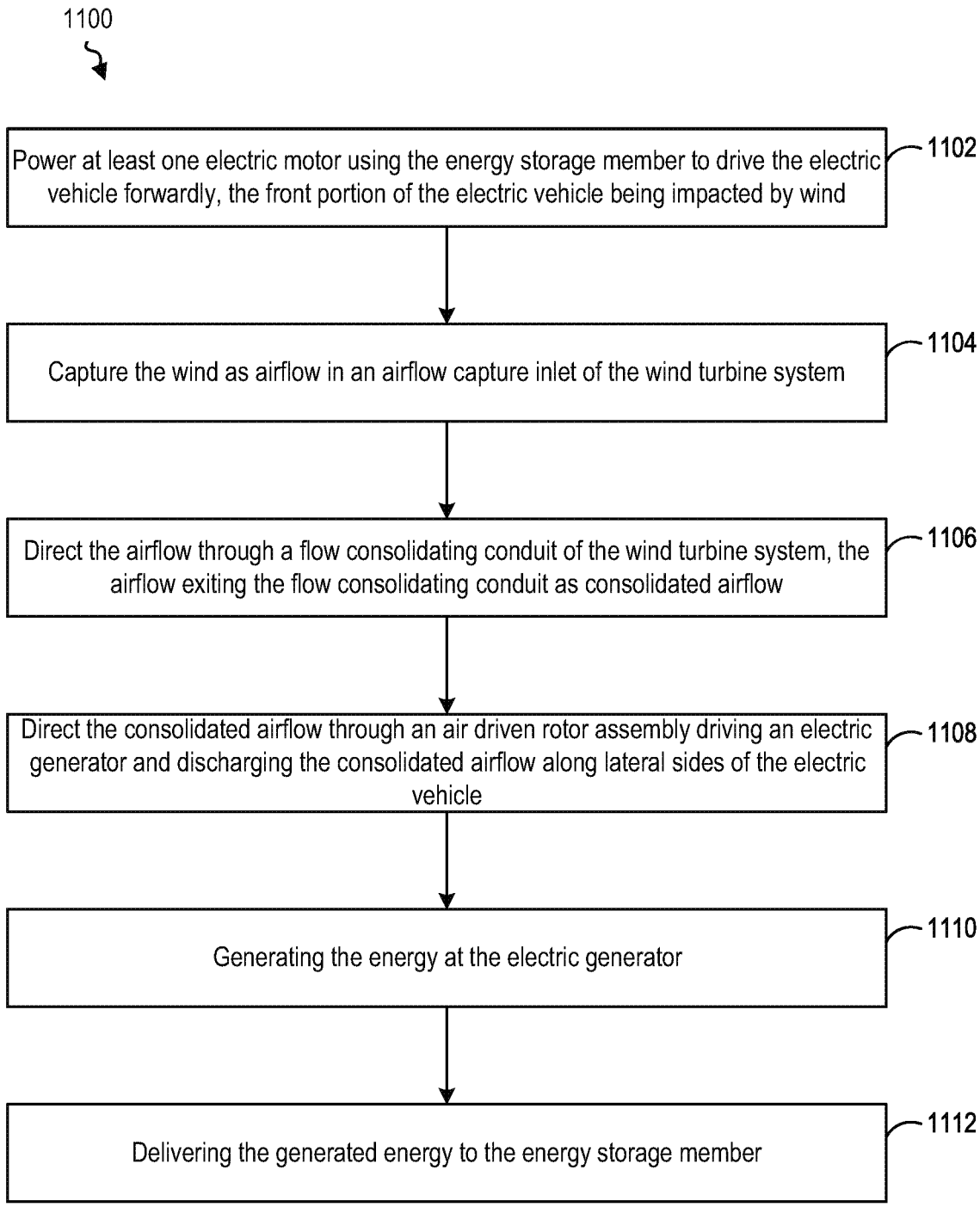
FIG. 11 is a flowchart of an example method of generating energy in the vehicle of FIG. 1

Referring now to FIG. 11, shown therein is a flowchart of an example method 1100 of generating energy in an electric vehicle. For example, electric vehicle can include vehicle 100. To assist with the description of method 1100, reference will be made simultaneously to FIGS. 12A and 12B.

Figure 12A:
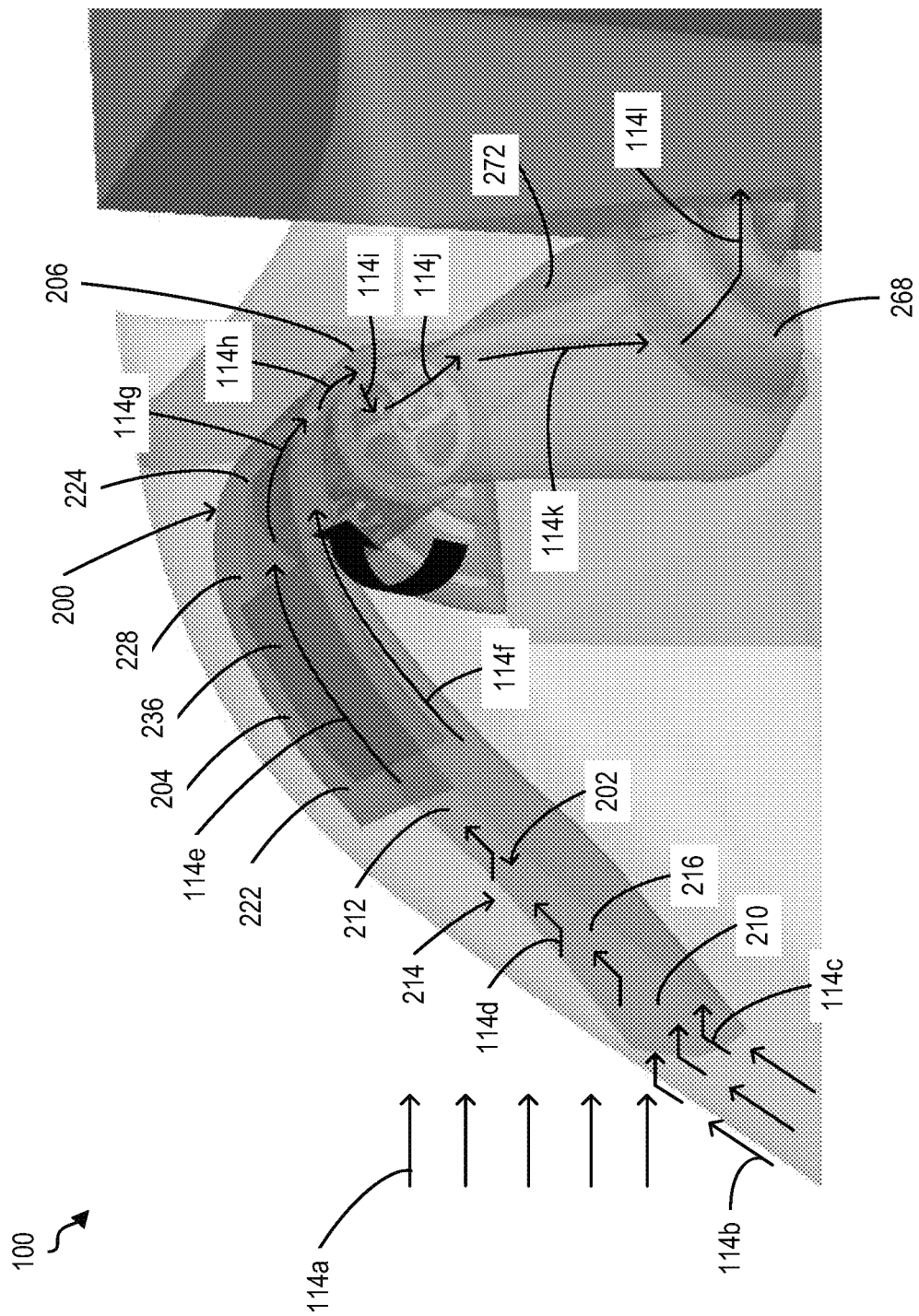
FIG. 12A is a detail side perspective semi-transparent view of the wind turbine system of FIG. 3B showing example flow paths of airflow through the wind turbine system.

At 1102, at least one electric motor 112 (shown in FIG. 8) is powered using storage energy member 270 (shown in FIG. 8) to drive electric vehicle 100 (shown in FIG. 1A) forwardly. At 1102, front portion 104 (shown in FIG. 1A) of electric vehicle 100 (shown in FIG. 1A) is impacted by wind 114 (shown in FIG. 12A). Referring to FIG. 12A, the illustrated example shows wind 114a-c impacting vehicle 100. For example, wind 114 can include wind 114a which impacts vehicle 100 in a direction that is substantially parallel and opposite to the direction in which vehicle 100 is moving, wind 114b which travels upwardly along vehicle 100, and wind 114c which includes wind 114b that may be redirected towards airflow capture inlet 202 by wind 114a.

As described with reference to FIGS. 1A and 1B, electric vehicle 100 may include electric vehicle body 102. Electric vehicle body 102 may have front portion 104 and forward projection area 106. Front portion 104 may include forward projection 108 that extends forwardly from front portion 104. Forward projection area 106 may include a surface area of forward projection 108.

Returning to FIG. 11, at 1104, wind 114 (shown in FIG. 12A) is captured as airflow in airflow capture inlet 202 (shown in FIG. 12A) of wind turbine system 200 (shown in FIG. 12A).

Referring to FIG. 12A, wind 114 may be captured as airflow in airflow capture inlet 202 in any manner suitable for directing the airflow downstream. In the example illustrated, wind 114a-c is captured as airflow 114d in airflow capture inlet 202. As shown, airflow 114d may be captured through air entry window 214 and directed across upwardly sloped flow directing floor 216 of airflow capture inlet 202 from inlet upstream end 210 to inlet downstream end 212. In alternative embodiments, airflow 114d is not directed across upwardly sloped flow directing floor 216.

As described with reference to FIGS. 2A and 2B, air entry window 214 can have forward projection area 220 that is at least 10% of forward projection area 106 of electric vehicle body 102. In some example embodiments, forward projection area 220 of air entry window 214 is at least 5%, such as 5% to 50% of forward projection area 106 of electric vehicle body 102, as described herein. In alternative embodiments, forward projection area 220 of air entry window 214 is less than 5% of forward projection area 106 of electric vehicle body 102, as described herein.

Referring to FIGS. 11 and 12A, at 1106, airflow 114e-f is directed through flow consolidating conduit 204 of wind turbine system 200. Airflow 114e-f exits flow consolidating conduit 204 as consolidated airflow 114g.

As described with reference to FIGS. 3A and 3B, flow consolidating conduit 204 may extend from consolidating conduit upstream end 222 to consolidating conduit downstream end 224. Flow consolidating conduit 204 may include conduit floor 226 and/or one or more flow partitions 236. In some example embodiments, conduit floor 226 can be convex. Flow consolidating conduit 204 may have a cross-sectional area 234 that may decrease towards downstream end 224 of flow consolidating conduit 204 thereby accelerating the air flow toward air driven rotor assembly 206.

Figure 12B:
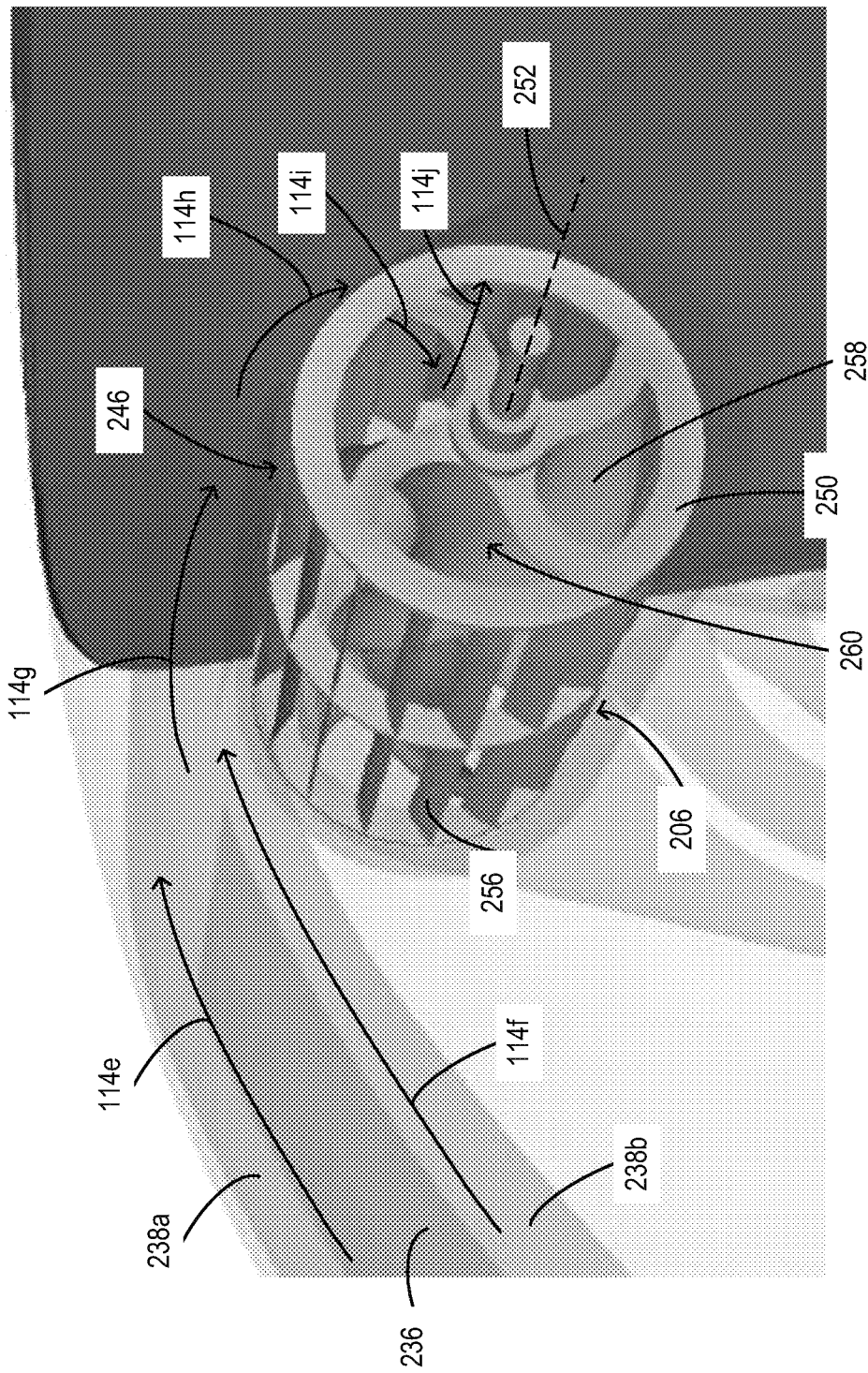
FIG. 12B is a side perspective semi-transparent view of a portion of the wind turbine system of FIG. 1 showing example flow paths of airflow through the wind turbine system

Referring to FIGS. 12A and 12B, airflow 114e-f may be directed through flow consolidating conduit 204 in any manner suitable for consolidating airflow and directing consolidated airflow downstream. For example, airflow 114e-f may be moved across conduit floor 226 and/or flow partition 236. In the illustrated example, airflow 114f is moved across convex conduit floor 226, which is contiguous with upwardly sloped flow directing floor 216. As shown, airflow 114e-f is directed through two flow paths 238a-b separated by flow partition 236. In alternative embodiments, airflow 114e-f are not directed through two flow paths 238a-b separated by flow partition 236.

At 1108, consolidated airflow 114g-i is directed through air driven rotor assembly 206. Air driven rotor assembly 206 drives electric generator 208 (shown in FIG. 8). At 1108, consolidated airflow 114l is discharged along lateral sides 109 (shown in FIG. 1A) of electric vehicle 100.

Referring to FIG. 12B, consolidated airflow 114g-i may be directed through air driven rotor assembly 206 in any manner suitable for driving air driven rotor 250. For example, consolidated airflow 114g-i may be directed towards air driven blades 256 and/or air redirecting blades 258. In the illustrated embodiment, consolidated airflow 114g is directed towards air driven rotor 250 of air driven rotor assembly 206 as airflow 114h. As shown, airflow 114i can be directed through air driven rotor 250 radially inwardly towards rotation axis 252 by air driven blades 256. In the illustrated example, airflow 114j is discharged by air redirecting blades 258 in an axial discharge direction 261 (shown in FIG. 5) that is substantially parallel to rotation axis 252 of air driven rotor 250. As shown, airflow 114j can be directed through flow exhaust conduit 272 as airflow 114k and discharged along lateral sides 109 (shown in FIG. 1A) of electric vehicle 100 as airflow 114l.

Returning now to FIG. 11, at 1110, the energy is generated at electric generator 208 (shown in FIG. 8). As described with reference to FIG. 7, electric generator 208 may be connected to air driven rotor 250. Electric generator 208 may generate electricity when air driven rotor 250 is driven by airflow, such as airflow 114g-i (shown in FIGS. 12A-B).

At 1112, the generated energy is delivered to energy storage member 270 (shown in FIG. 8). As described with reference to FIG. 8, energy storage member 270 may be electrically connected to electric generator 208 and may be any suitable energy storage member for a vehicle, such as electric vehicle 100. The generated energy that is delivered to energy storage member 270 can subsequently be used by electric motor 112 to power the electric vehicle 100. As such, the generated energy may extend the range of electric vehicle 100 by supplying to energy storage member 270 at least a portion of the energy drawn from energy storage member 270 to power the electric motor(s) of energy storage member 270.

Drag Reduction

In one aspect, embodiments described herein include a passive vehicle drag reduction system for reducing aerodynamic drag of a vehicle to improve the operational efficiency of the vehicle, which can extend the vehicle's range and thereby mitigate the aforementioned limited range and associated range anxiety. The term "passive" as used herein with reference to the passive vehicle drag reduction system means that the passive vehicle drag reduction system may include aspects that direct and redirect airflow through the passive vehicle drag reduction system without, for example, generating power using an electric generator connected to a rotor.

A vehicle moving in a forward direction generally has a significant amount of wind impacting a front portion of the vehicle. A vehicle having a suitable passive vehicle drag reduction system described herein can reduce aerodynamic drag of the vehicle by capturing a large portion of the wind impacting the front portion of the vehicle and efficiently redirecting it away from the front portion of the vehicle.

The wind impacting the front portion of the vehicle can have high turbulence, particularly when the vehicle is travelling at high speeds. Airflow with high turbulence can cause a passive vehicle drag reduction system to operate less efficiently than if the airflow had lower turbulence. At least some embodiments disclosed here include a redirecting rotor portion for efficiently redirecting airflow passing through the vehicle drag reduction system. If airflow enters the redirecting rotor portion with high turbulence, the redirecting rotor portion may operate less efficiently (i.e., poorer redirection of airflow) than if the airflow entered with lower turbulence (i.e. with higher flow coherence). Accordingly, at least some embodiments disclosed herein are configured to reduce the turbulence of the captured wind in a portion of the passive vehicle drag reduction system that is upstream of the redirecting rotor portion.

Without being limited by theory, it is also believed that the redirecting rotor portion of the passive vehicle drag reduction system may operate more efficiently with a singular, consolidated, high velocity air flow. Accordingly, at least some embodiments disclosed herein may be configured to merge and/or consolidate and also accelerate the incoming airflow upstream of the redirecting rotor portion of the passive vehicle drag reduction system. That is, the airflow can enter the redirecting rotor portion of the passive vehicle drag reduction system as a consolidated singular flow, rather than, for example, as a plurality of discrete airflows that enter the redirecting rotor portion at different locations around a perimeter of the redirecting rotor portion.

Airflow discharged from the vehicle, such as airflow from the passive vehicle drag reduction system, can fail to reduce aerodynamic drag of the vehicle if discharged in an unsuitable direction. Accordingly, at least some embodiments disclosed herein may be configured to discharge airflow from the vehicle and/or passive vehicle drag reduction system in a direction that is suitable for reducing aerodynamic drag of the vehicle.

Embodiments of the passive vehicle drag reduction system described herein may embody any one or more of the above described design aspects. For example, the disclosed passive vehicle drag reduction system may include an airflow capture inlet that can capture a large portion of the wind impacting the front portion of the vehicle that is then directed through the passive vehicle drag reduction system. Alternatively or in addition, the disclosed passive vehicle drag reduction system may include a concave flow directing floor upstream of a convex conduit floor to direct the captured wind through the passive vehicle drag reduction system. Alternatively or in addition, the disclosed passive vehicle drag reduction system may include a flow consolidating conduit having a decreasing cross-sectional area and one or more flow partitions to reduce the turbulence (and increase flow coherence) of the captured wind and consolidate the airflow. Alternatively or in addition, the disclosed passive vehicle drag reduction system may include one or more flow exhaust conduits having a redirecting exhaust outlet located laterally of an air driven rotor assembly of the passive vehicle drag reduction system. Other embodiments described herein may have none of these design aspects.

Figure 13:
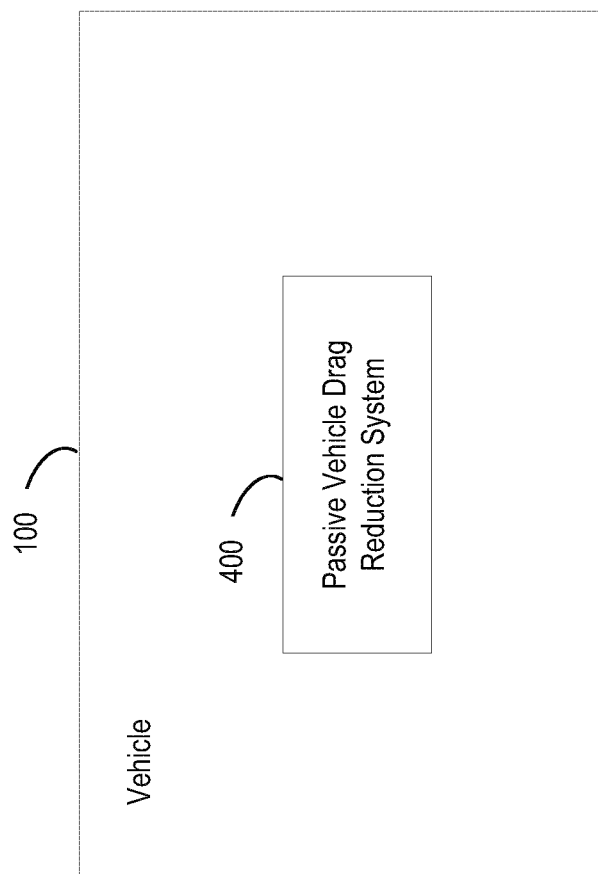
FIG. 13 is a schematic of the vehicle of FIG. 1 including a passive vehicle drag reduction system.

Referring to FIG. 13, shown therein is a schematic of vehicle 100 including a passive vehicle drag reduction system 400. Although the following description will refer to aspects of wind turbine system 200 previously described with reference to, for example, FIGS. 1-12B, it should be understood that in at least FIGS. 1-6B and 9A-12B, wind turbine system 200 can be replaced by passive vehicle drag reduction system 400.

Furthermore, it should be understood that the above description of any aspects of wind turbine system 200 may apply to passive vehicle drag reduction system 400. In particular, passive vehicle drag reduction system 400 may be substantially the same as the embodiments of wind turbine system 200. In some embodiments, passive vehicle drag reduction system 400 is the same as the above described embodiments of wind turbine system 200 except that passive vehicle drag reduction system 400 does not include a generator and air driven rotor 260 rotates freely. This may permit vehicle drag reduction system 400 to be incorporated into a vehicle at much lower cost than wind turbine system 200 and contribute to an extended range for the vehicle by reducing aerodynamic drag. This may also permit vehicle drag reduction system 400 to contribute to extended vehicle range for non-electric vehicles (i.e. fuel consuming vehicles, such as gasoline, diesel, or coal powered vehicles).

Referring to FIGS. 1-6B and 13, passive vehicle drag reduction system 400 may include airflow capture inlet 202, flow consolidating conduit 204, and air driven rotor assembly 206. Each of airflow capture inlet 202, flow consolidating conduit 204, and air driven rotor assembly 206 may include any operable combination of aspects of airflow capture inlet 202, flow consolidating conduit 204, and air driven rotor assembly 206, respectively, as previously described.

Referring to FIGS. 1A and 3C, airflow capture inlet 202 may define any airflow capture inlet direction 219 suitable for capturing airflow. In the illustrated example, airflow capture inlet direction 219 is shown to impact vehicle 100 in a direction that is substantially parallel and opposite to the direction in which vehicle 100 is moving.

Referring to FIG. 4A, air driven rotor assembly 206 may have any design suitable for receiving airflow from upstream passive vehicle drag reduction system 400. For example, air driven rotor assembly 206 may include a rotor assembly inlet 257. In the example illustrated, air driven rotor assembly 206 includes rotor assembly inlet 257 located downstream of consolidating conduit downstream end 224. As shown, rotor assembly inlet 257 defines a rotor airflow inlet direction 259, which is transverse to rotation axis 252. In alternative embodiments, air driven rotor assembly 206 does not include rotor assembly inlet 257. In alternative embodiments, rotor airflow inlet direction 259 is not transverse to rotation axis 252.

Referring to FIG. 5, air redirecting blades 258 may have any design suitable for redirecting airflow from air driven rotor 250. For example, air redirecting blades 258 may define one or more rotor outlet directions 261. In the illustrated example, air redirecting blades 258 define rotor outlet direction 261, which is substantially parallel to rotation axis 252. This may allow airflow to be more efficiently discharged along lateral sides 109 (shown in FIG. 1A) of vehicle 100 (shown in FIG. 1A). In alternative embodiments, rotor outlet direction 261 is not substantially parallel to rotation axis 252.

Referring to FIGS. 3A-B and 13, passive vehicle drag reduction system 400 may have any design suitable for exhausting airflow from passive vehicle drag reduction system 400. For example, passive vehicle drag reduction system 400 may include one or more flow exhaust conduits 272 that direct airflow downstream towards a redirecting exhaust outlet 268. In the illustrated embodiment, flow exhaust conduit 272 is downstream of air driven rotor assembly 206 and extends from exhaust conduit upstream end 276 to exhaust conduit downstream end 278. As shown, flow exhaust conduit 272 is close sided. In the illustrated example, flow exhaust conduit 272 includes redirecting exhaust outlet 268 located laterally of air driven rotor assembly 206. This may allow airflow that exits air driven rotor assembly 206 along rotor outlet direction 261 to be more efficiently discharged from passive vehicle drag reduction system 400 through redirecting exhaust outlet 268. In alternative embodiments, redirecting exhaust outlet 268 is not located laterally of air driven rotor assembly 206.

Referring to FIGS. 1A, 3A, and 3B, flow exhaust conduit 272 may have any design suitable for redirecting exhausted airflow in any suitable direction. For example, flow exhaust conduit 272 may include redirecting exhaust outlet 268 defining an exhaust outlet airflow direction 274. In the illustrated embodiment, redirecting exhaust outlet 268 is positioned downstream exhaust conduit downstream end 278. As shown, redirecting exhaust outlet 268 may include one or more outlet redirecting blades 273 that define exhaust outlet airflow direction 274. In the illustrated example, outlet redirecting blades 273 are curved in exhaust outlet airflow direction 274. As shown, outlet airflow direction 274 is substantially parallel to airflow capture inlet direction 219. This may allow discharged air to flow along lateral sides 109 of vehicle 100, which may provide a more aerodynamically efficient air flow path for reducing aerodynamic drag of vehicle 100. In alternative embodiments, flow exhaust conduit 272 does not include redirecting exhaust outlet 268. In alternative embodiments, redirecting exhaust outlet 268 does not include outlet redirecting blades 273. In alternative embodiments, outlet airflow direction 274 is not substantially parallel to airflow capture inlet direction 219.

Figure 3D:
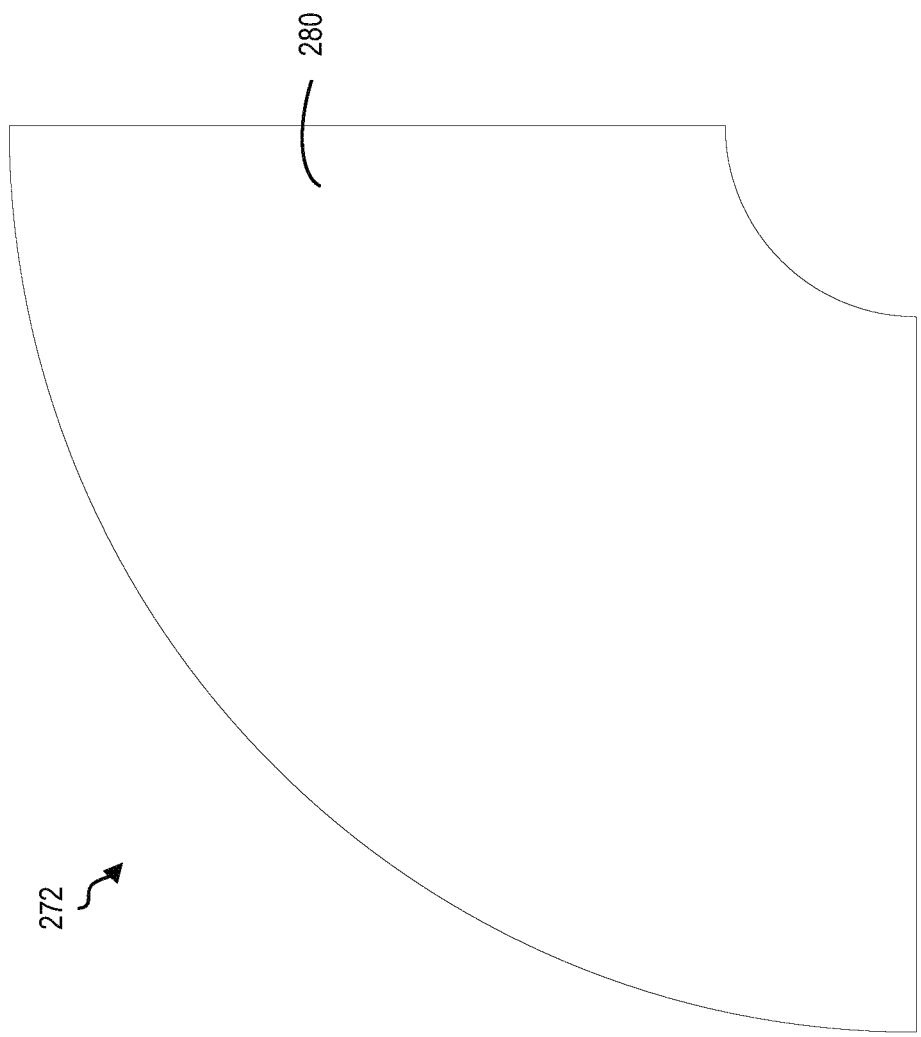
FIG. 3D is a cross-section taken along line 3D-3D in FIG. 3B.

Referring to FIGS. 3B and 3D, flow exhaust conduit 272 may have any suitable cross-sectional area 280 for directing airflow downstream. For example, flow exhaust conduit 272 may have cross-sectional area 280 that allows efficient directing of airflow between air driven rotor assembly 206 and redirecting exhaust outlet 268. In the illustrated example, flow exhaust conduit 272 has cross-sectional area 280 that increases between exhaust conduit upstream end 276 and exhaust conduit downstream end 278 toward exhaust conduit downstream end 278. This may arrange airflow at exhaust conduit downstream end 278 in a manner (e.g., lower velocity) to be discharged through redirecting exhaust outlet 268 in exhaust outlet airflow direction 274 at a suitable velocity for reducing aerodynamic drag of vehicle 100. As shown, cross-sectional area 280 has a pie arc shape. This may arrange airflow at exhaust conduit downstream end in a manner to be discharged through redirecting exhaust outlet 268 in exhaust outlet airflow direction 274. In alternative embodiments, cross-sectional area 280 is not increasing between exhaust conduit upstream end 276 and exhaust conduit downstream end 278. In alternative embodiments, cross-sectional area 280 has any other suitable shape for directing airflow downstream.

Referring now to FIGS. 9A-9F and 13, vehicle 100 may be any type of vehicle suitable for including passive vehicle drag reduction system 400. For example, vehicle 100 can include aircraft 100a, watercraft 100b, rail transport vehicle 100c, automobile 100d, truck 100e, or motorcycle 100f as described previously with reference to FIGS. 9A-F.

Figure 14:
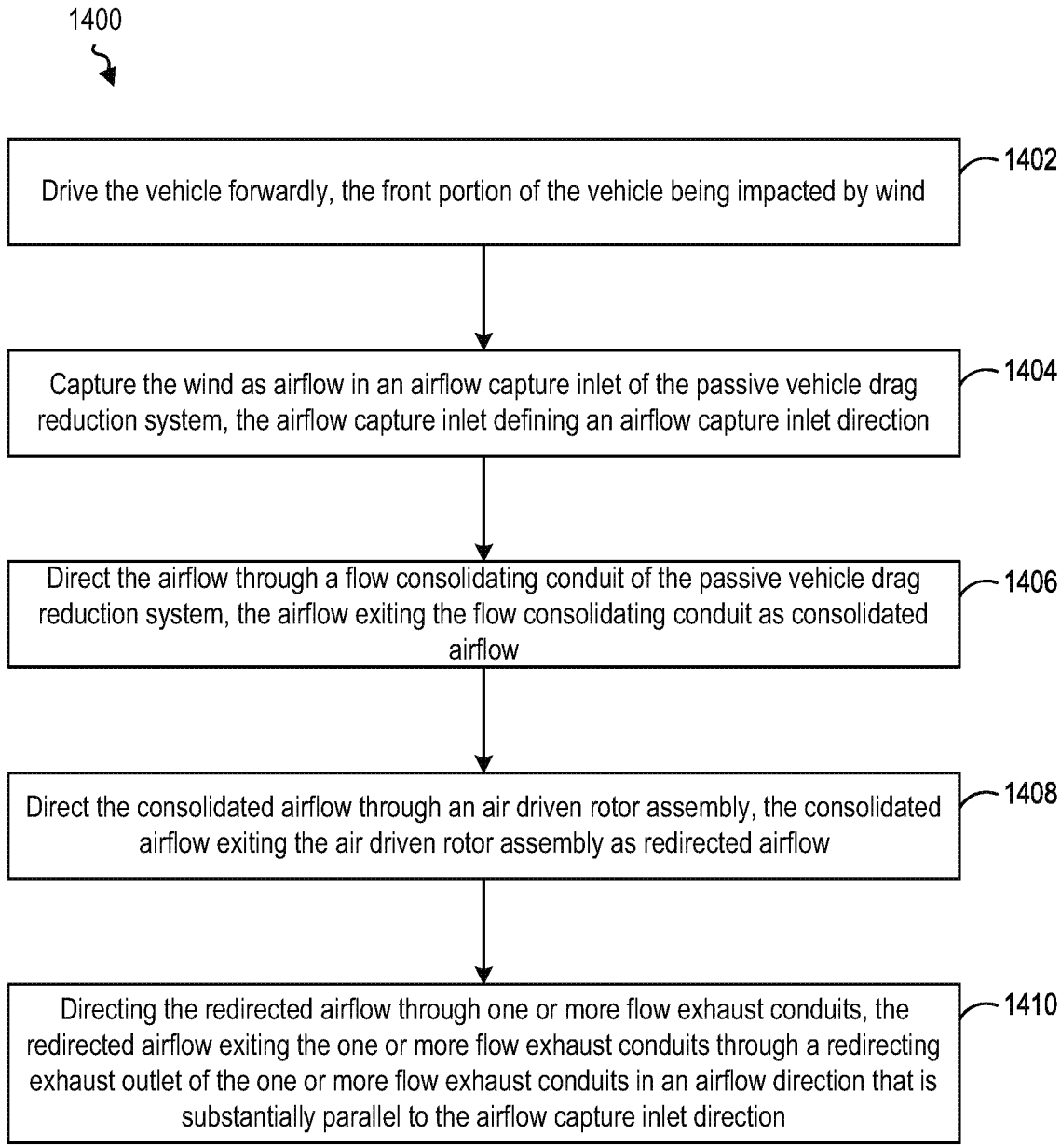
FIG. 14 is a flowchart of an example method of reducing aerodynamic drag of the vehicle of FIG. 1.

Referring now to FIG. 14, shown therein is a flowchart of an example method 1400 of reducing aerodynamic drag of a vehicle. For example, the vehicle can include vehicle 100. To assist with the description of method 1400, reference will be made simultaneously to FIGS. 12A and 12B.

At 1402, vehicle 100 (shown in FIG. 1A) is driven forwardly. Front portion 104 (shown in FIG. 1A) of vehicle 100 (shown in FIG. 1A) is impacted by wind 114 (shown in FIG. 12A). Referring to FIG. 12A, the illustrated example shows wind 114a-c impacting vehicle 100. For example, wind 114 can include wind 114a which impacts vehicle 100 in a direction that is substantially parallel and opposite to the direction in which vehicle 100 is moving, wind 114b which travels upwardly along vehicle 100, and wind 114c which includes wind 114b that may be redirected towards airflow capture inlet 202 by wind 114a.

As described with reference to FIGS. 1A and 1B, vehicle 100 may include vehicle body 102. Vehicle body 102 may have front portion 104 and forward projection area 106. Front portion 104 may include forward projection 108 that extends forwardly from front portion 104. Forward projection area 106 may include a surface area of forward projection 108.

Returning to FIG. 14, at 1402, wind 114 (shown in FIG. 12A) is captured as airflow in airflow capture inlet 202 (shown in FIG. 12A) of passive vehicle drag reduction system 400 (shown in FIG. 13).

Referring to FIG. 12A, wind 114 may be captured as airflow in airflow capture inlet 202 in any manner suitable for directing downstream. In the example illustrated, wind 114a-c is captured as airflow 114d in airflow capture inlet 202. As shown, airflow 114d may be captured through air entry window 214 and directed across upwardly sloped flow directing floor 216 of airflow capture inlet 202 from inlet upstream end 210 to inlet downstream end 212. In alternative embodiments, airflow 114d is not directed across upwardly sloped flow directing floor 216. As described with reference to FIGS. 1A and 3C, airflow capture inlet 202 may define any airflow capture inlet direction 219 suitable for capturing airflow, such as in a direction that is substantially parallel and opposite to the direction in which vehicle 100 is moving.

As described with reference to FIGS. 2A and 2B, air entry window 214 can have forward projection area 220 that is at least 10% of forward projection area 106 of electric vehicle body 102. In some example embodiments, forward projection area 220 of air entry window 214 is at least 5%, such as 5% to 50% of forward projection area 106 of electric vehicle body 102, as described herein. In alternative embodiments, forward projection area 220 of air entry window 214 is less than 5% of forward projection area 106 of electric vehicle body 102, as described herein.

Returning to FIGS. 12A and 14, airflow 114e-f is directed through flow consolidating conduit 204 of passive vehicle drag reduction system 400. Airflow 114e-f exits flow consolidating conduit 204 as consolidated airflow 114g.

As described with reference to FIGS. 3A and 3B, flow consolidating conduit 204 may extend from consolidating conduit upstream end 222 to consolidating conduit downstream end 224. Flow consolidating conduit 204 may include conduit floor 226 and/or one or more flow partitions 236. In some example embodiments, conduit floor 226 can be convex. Flow consolidating conduit 204 may have a cross-sectional area 234 that may decrease towards downstream end 224 of flow consolidating conduit 204 thereby accelerating the air flow toward air driven rotor assembly 206.

Referring to FIGS. 12A and 12B, airflow 114e-f may be directed through flow consolidating conduit 204 in any manner suitable for consolidating airflow and directing consolidated airflow downstream. For example, airflow 114e-f may be moved across conduit floor 226 and/or flow partition 236. In the illustrated example, airflow 114f is moved across convex conduit floor 226, which is contiguous with upwardly sloped flow directing floor 216. As shown, airflow 114e-f is directed through two flow paths 238a-b separated by flow partition 236. In alternative embodiments, airflow 114e-f are not directed through two flow paths 238a-b separated by flow partition 236.

Returning to FIGS. 12A-B and 14, at 1408, consolidated airflow 114g-i is directed through air driven rotor assembly 206. Consolidated airflow 114g-i exits air driven rotor assembly 206 as redirected airflow.

Referring to FIG. 12B, consolidated airflow 114g-i may be directed through air driven rotor assembly 206 in any manner suitable for redirecting airflow. For example, consolidated airflow 114g-i may be directed towards air driven blades 256 and/or air redirecting blades 258. In the illustrated embodiment, consolidated airflow 114g is directed towards air driven rotor 250 of air driven rotor assembly 206 as airflow 114h. As shown, airflow 114i can be directed through air driven rotor 250 radially inwardly towards rotation axis 252 by air driven blades 256. In the illustrated example, redirected airflow 114j is discharged by air redirecting blades 258 in an axial discharge direction 261 (shown in FIG. 5) that is substantially parallel to rotation axis 252 of air driven rotor 250.

Returning to FIGS. 12A and 14, at 1410, redirected airflow 114j-k is directed through one or more flow exhaust conduits 272. Redirected airflow 114j-k exits flow exhaust conduit 272 as airflow 114l through redirecting exhaust outlet 268 in airflow direction 274 (shown in FIG. 1A) that is substantially parallel to airflow capture inlet direction 219 (shown in FIG. 1A).

As described with reference to FIGS. 1A, 3A, and 3B, redirecting exhaust outlet may include one or more outlet redirecting blades 273 that define exhaust outlet airflow direction 274. For example, outlet redirecting blades 273 may be curved in exhaust outlet airflow direction 274. Outlet airflow direction 274 is substantially parallel to airflow capture inlet direction 219. This may allow discharged air to flow along lateral sides 109 of vehicle 100, which may provide a more aerodynamically efficient air flow path for reducing aerodynamic drag of vehicle 100.

As described with reference to FIGS. 3B and 3D, flow exhaust conduit 272 may extend from exhaust conduit upstream end 276 to exhaust conduit downstream end 278 and may have a cross-sectional area 280. Cross sectional-area 280 may increase between exhaust conduit upstream end 276 and exhaust conduit downstream end 278 towards consolidating conduit downstream end 278.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Items

Item 1: A vehicle comprising:
a vehicle body having a front portion, and a wind turbine system, the front portion defining a first forward projection area, the wind turbine system comprising:
an airflow capture inlet having an inlet upstream end, an inlet downstream end, an air entry window, and a flow directing floor,
each of the air entry window and the flow directing floor extending from the inlet upstream end to the inlet downstream end,
the air entry window defining a second forward projection area that is at least 10% of the first forward projection area,
the flow directing floor being sloped upwardly from the inlet upstream end toward the inlet downstream end;
a flow consolidating conduit that is close sided and extends from a consolidating conduit upstream end at the inlet downstream end, to a consolidating conduit downstream end;
an air driven rotor assembly having a rotor assembly upstream end located downstream of the consolidating conduit downstream end, the air driven rotor assembly comprising an air driven rotor; and
an electric generator connected to the air driven rotor.
Item 2: The vehicle of any preceding item, wherein the inlet downstream end is located at a higher elevation than the inlet upstream end.
Item 3: The vehicle of any preceding item, wherein the air entry window overlies the flow directing floor.
Item 4: The vehicle of any preceding item, wherein the airflow capture inlet is formed as an open sided conduit, and the flow directing floor and the air entry window form opposing sides of the open sided conduit.
Item 5: The vehicle of any preceding item, wherein the flow consolidating conduit includes a conduit floor, the conduit floor being contiguous with the flow directing floor.

Item 6: The vehicle of any preceding item, wherein the vehicle further comprises an energy storage member, the energy storage member being electrically connected to the electric generator.
Item 7: The vehicle of any preceding item, wherein the air driven rotor comprises:
a laterally extending rotation axis;
a plurality of air driven blades and having a radially inward discharge direction; and one or more air redirecting blades located radially inward of the air driven blades and having an axial discharge direction that is substantially parallel to the rotation axis.
Item 8: The vehicle of any preceding item, wherein the vehicle comprises an aircraft, a watercraft, a rail transport vehicle, an automobile, a truck, or a motorcycle.
Item 9: A vehicular wind turbine system comprising:
an airflow capture inlet having an inlet upstream end, an inlet downstream end, an air entry window, and a concave flow directing floor,
each of the air entry window and the concave flow directing floor extending from the inlet upstream end to the inlet downstream end,
the concave flow directing floor being sloped upwardly from the inlet upstream end toward the inlet downstream end;
a flow consolidating conduit that is close sided and extends from a consolidating conduit upstream end at the inlet downstream end, to a consolidating conduit downstream end,
the flow consolidating conduit comprising a convex conduit floor that is contiguous with the concave flow directing floor; and
an air driven rotor assembly having a rotor assembly upstream end located downstream of the consolidating conduit downstream end, the air driven rotor assembly comprising an air driven rotor.
Item 10: The vehicular wind turbine system of any preceding item, wherein the consolidating conduit downstream end is joined to an upper portion of the air driven rotor assembly.
Item 11: The vehicular wind turbine system of any preceding item, wherein the consolidating conduit downstream end is positioned at an elevation above the air driven rotor assembly.
Item 12: The vehicular wind turbine system of any preceding item, further comprising an electric generator, the electric generator being connected to the air driven rotor.
Item 13: A vehicle comprising the vehicular wind turbine system of any preceding item.
Item 14: The vehicle of any preceding item, wherein the vehicle comprises an aircraft, a watercraft, a rail transport vehicle, an automobile, a truck, or a motorcycle.
Item 15: A vehicular wind turbine system comprising:
an airflow capture inlet having an inlet upstream end, an inlet downstream end, an air entry window, and a flow directing floor,
each of the air entry window and the flow directing floor extending from the inlet upstream end to the inlet downstream end,
the flow directing floor being sloped upwardly from the inlet upstream end toward the inlet downstream end;
a flow consolidating conduit that is close sided and extends from a consolidating conduit upstream end at the inlet downstream end, to a consolidating conduit downstream end, the flow consolidating conduit comprising one or more flow partitions that subdivide a cross-sectional area of the flow consolidating conduit into two or more flow paths, each flow partition and each flow path extending between the consolidating conduit upstream end and the consolidating conduit downstream end, each flow partition having a partition downstream end located upstream of the consolidating conduit downstream end, each flow path adjacent each flow partition merging at each partition downstream end into a merged flow path, the cross-sectional area of the flow consolidating conduit decreasing between the consolidating conduit upstream end and the consolidating conduit downstream end toward the consolidating conduit downstream end; and an air driven rotor assembly having a rotor assembly upstream end located downstream of the consolidating conduit downstream end, the air driven rotor assembly comprising an air driven rotor.

Item 16: The vehicular wind turbine system of any preceding item, wherein the one or more flow partitions comprises a plurality of flow partitions, each flow partition having a partition length, the partition length of each flow partition being different from the partition length of at least one other flow partition.

Item 17: The vehicular wind turbine system of any preceding item, wherein the flow consolidating conduit has a conduit length and each partition downstream end is differently positioned along the conduit length than at least one other partition downstream end.

Item 18: The vehicular wind turbine system of any preceding item, wherein a number of flow partitions located at a position along the flow consolidating conduit is decreasing towards the consolidating conduit downstream end.

Item 19: The vehicular wind turbine system of any preceding item, further comprising an electric generator, the electric generator being connected to the air driven rotor.

Item 20: A vehicle comprising the vehicular wind turbine system of any preceding item.

Item 21: The vehicle of any preceding item, wherein the vehicle comprises an aircraft, a watercraft, a rail transport vehicle, an automobile, a truck, or a motorcycle.

Item 22: A method of generating energy in an electric vehicle, the electric vehicle comprising a wind turbine system, and at least one electric motor electrically connected to an energy storage member, the method comprising:

powering the at least one electric motor using the energy storage member to drive the electric vehicle forwardly, a front portion of the electric vehicle being impacted by wind;

capturing the wind as airflow in an airflow capture inlet of the wind turbine system;

directing the airflow through a flow consolidating conduit of the wind turbine system, the flow consolidating conduit having a cross-sectional area that decreases towards a downstream end of the flow consolidating conduit, the airflow exiting the flow consolidating conduit as consolidated airflow;

directing the consolidated airflow through an air driven rotor assembly driving an electric generator and discharging the consolidated airflow along lateral sides of the electric vehicle;

generating the energy at the electric generator; and delivering the generated energy to the energy storage member.

Item 23: The method of any preceding item, wherein said capturing comprises moving the airflow across an upwardly sloped flow directing floor of the airflow capture inlet from an upstream end of the airflow capture inlet to a downstream end of the airflow capture inlet.

Item 24: The method of any preceding item, wherein the upwardly sloped flow directing floor is concave, and said directing the airflow through the flow consolidating conduit comprises moving the airflow across a convex conduit floor of the flow consolidating conduit that is contiguous with the upwardly sloped flow directing floor.

Item 25: The method of any preceding item, wherein said directing the consolidated airflow comprises:

directing the consolidated airflow through an air driven rotor of the air driven rotor assembly; and discharging the consolidated airflow in an axial discharge direction that is substantially parallel to a laterally extending rotation axis of the air driven rotor.

Item 26: The method of any preceding item, wherein said capturing comprises capturing the airflow through an air entry window of the airflow capture inlet, the air entry window defining a first forward projection area that is at least 10% of a second forward projection area defined by a front portion of a vehicle body of the electric vehicle.

Item 27: The method of any preceding item, wherein said directing the airflow through the flow consolidating conduit comprises directing the airflow through two or more flow paths defined by one or more flow partitions of the flow consolidating conduit.

Item 28: The method of any preceding item, wherein the electric vehicle comprises an aircraft, a watercraft, a rail transport vehicle, an automobile, a truck, or a motorcycle.

Item 29: A wind deflector securable above a tractor unit, the wind deflector comprising: a wind deflector body having a front portion, and a wind turbine system, the front portion defining a first forward projection area, the wind turbine system comprising:

an airflow capture inlet having an inlet upstream end, an inlet downstream end, an air entry window, and a flow directing floor, each of the air entry window and the flow directing floor extending from the inlet upstream end to the inlet downstream end, the air entry window defining a second forward projection area that is at least 10% of the first forward projection area, the flow directing floor being sloped upwardly from the inlet upstream end toward the inlet downstream end;

a flow consolidating conduit that is close sided and extends from a consolidating conduit upstream end at the inlet downstream end, to a consolidating conduit downstream end; and an air driven rotor assembly having a rotor assembly upstream end located downstream of the consolidating conduit downstream end, the air driven rotor assembly comprising an air driven rotor.

Item 30: The wind deflector of any preceding item, further comprising an electric generator electrically connected to the air driven rotor.

Item 31: A vehicular wind turbine system comprising:

an airflow capture inlet having an inlet upstream end, an inlet downstream end, an air entry window, and a flow directing floor, the air entry window defining a forward projection area, the flow directing floor being sloped upwardly from the inlet upstream end toward the inlet downstream end;

a flow consolidating conduit that is close sided and extends from a consolidating conduit upstream end at the inlet downstream end, to a consolidating conduit downstream end;

the flow consolidating conduit having a cross-sectional area at the consolidating conduit upstream end, the forward projection area being 2 to 50 times the cross-sectional area;

an air driven rotor assembly having a rotor assembly upstream end located downstream of the consolidating conduit downstream end, the air driven rotor assembly comprising an air driven rotor.

Item 32: A passive vehicle drag reduction system comprising:

an airflow capture inlet having an inlet upstream end, an inlet downstream end, an air entry window, and a flow directing floor, each of the air entry window and the flow directing floor extending from the inlet upstream end to the inlet downstream end, the flow directing floor being sloped upwardly from the inlet upstream end toward the inlet downstream end, the airflow capture inlet defining an airflow capture inlet direction;

a flow consolidating conduit that is close sided and extends from a consolidating conduit upstream end at the inlet downstream end, to a consolidating conduit downstream end;

an air driven rotor assembly having a rotor assembly inlet located downstream of the consolidating conduit downstream end, and an air driven rotor, the rotor assembly inlet defining a rotor airflow inlet direction, the air driven rotor having a laterally extending rotation axis transverse to the rotor airflow inlet direction, a plurality of air driven blades, and one or more air redirecting blades interior of the plurality of air driven blades, the air redirecting blades defining one or more rotor airflow outlet directions substantially parallel to the rotation axis; and one or more flow exhaust conduits downstream of the air driven rotor assembly, each of the one or more flow exhaust conduits being close sided and having a redirecting exhaust outlet located laterally of the air driven rotor assembly, the redirecting exhaust outlet defining an exhaust outlet airflow direction that is substantially parallel to the airflow capture inlet direction.

Item 33: The passive vehicle drag reduction system of any preceding item, wherein the inlet downstream end is located at a higher elevation than the inlet upstream end.

Item 34: The passive vehicle drag reduction system of any preceding item, wherein the air entry window overlies the flow directing floor.

Item 35: The passive vehicle drag reduction system of any preceding item, wherein the airflow capture inlet is formed as an open sided conduit, and the flow directing floor and the air entry window form opposing sides of the open sided conduit.

Item 36: The passive vehicle drag reduction system of any preceding item, wherein the flow consolidating conduit includes a conduit floor, the conduit floor being contiguous with the flow directing floor.

Item 37: The passive vehicle drag reduction system of any preceding item, wherein the flow directing floor is concave and the conduit floor is convex.

Item 38: The passive vehicle drag reduction system of any preceding item, wherein the flow consolidating conduit includes one or more flow partitions that subdivide a cross-sectional area of the flow consolidating conduit into two or more flow paths, each flow partition and each flow path extending between the consolidating conduit upstream end and the consolidating conduit downstream end, each flow partition having a partition downstream end located upstream of the consolidating conduit downstream end, each flow path adjacent each flow partition merging at each partition downstream end into a merged flow path, the cross-sectional area of the flow consolidating conduit decreasing between the consolidating conduit upstream end and the consolidating conduit downstream end toward the consolidating conduit downstream end.

Item 39: The passive vehicle drag reduction system of any preceding item, wherein the plurality of air driven blades have a radially inward discharge direction.

Item 40: The passive vehicle drag reduction system of any preceding item, wherein the redirecting exhaust outlet includes one or more outlet redirecting blades curved in the exhaust outlet airflow direction.

Item 41: The passive vehicle drag reduction system of any preceding item, wherein the one or more flow exhaust conduits extend from an exhaust conduit upstream end to an exhaust conduit downstream end, and have a cross-sectional area, the cross sectional-area increasing between the exhaust conduit upstream end and the exhaust conduit downstream end toward the consolidating conduit downstream end.

Item 42: A vehicle having the passive vehicle drag reduction system of any preceding item, wherein the vehicle comprises an aircraft, a watercraft, a rail transport vehicle, an automobile, a truck, or a motorcycle.

Item 43: A method of reducing aerodynamic drag of a vehicle, the vehicle comprising a passive vehicle drag reduction system, the method comprising:

driving the vehicle forwardly, a front portion of the vehicle being impacted by wind;

capturing the wind as airflow in an airflow capture inlet of the passive vehicle drag reduction system, the airflow capture inlet defining an airflow capture inlet direction;

directing the airflow through a flow consolidating conduit of the passive vehicle drag reduction system, the flow consolidating conduit having a cross-sectional area that decreases towards a downstream end of the flow consolidating conduit, the airflow exiting the flow consolidating conduit as consolidated airflow;

directing the consolidated airflow through an air driven rotor assembly of the passive vehicle drag reduction system, the air driven rotor assembly having one or more air redirecting blades, the consolidated airflow exiting the air driven rotor assembly as redirected airflow; and directing the redirected airflow through one or more flow exhaust conduits of the passive vehicle drag reduction system, the one or more flow exhaust conduits having a redirecting exhaust outlet located laterally of the air driven rotor assembly, the redirected airflow exiting the one or more flow exhaust conduits through the redirecting exhaust outlet in an exhaust outlet airflow direction that is substantially parallel to the airflow capture inlet direction.

Item 44: The method of any preceding item, wherein said capturing comprises moving the airflow across an upwardly sloped flow directing floor of the airflow capture inlet from an upstream end of the airflow capture inlet to a downstream end of the airflow capture inlet. Item 45: The method of any preceding item, wherein the upwardly sloped flow directing floor is concave, and said directing the airflow through the flow consolidating conduit comprises moving the airflow across a convex conduit floor of the flow consolidating conduit that is contiguous with the upwardly sloped flow directing floor.

Item 46: The method of any preceding item, wherein said capturing comprises capturing the airflow through an air entry window of the airflow capture inlet, the air entry window defining a first forward projection area that is at least 10% of a second forward projection area defined by a front portion of a vehicle body of the vehicle.

Item 47: The method of any preceding item, wherein said directing the airflow through the flow consolidating conduit comprises directing the airflow through two or more flow paths defined by one or more flow partitions of the flow consolidating conduit.

Item 48: The method of any preceding item, wherein the redirecting exhaust outlet includes one or more outlet redirecting blades curved in the exhaust outlet airflow direction.

Item 49: The method of any preceding item, wherein the one or more flow exhaust conduits extend from an exhaust conduit upstream end to an exhaust conduit downstream end, and have a cross-sectional area, the cross sectional-area increasing between the exhaust conduit upstream end and the exhaust conduit downstream end toward the consolidating conduit downstream end.

Item 50: The method of any preceding item, wherein the vehicle comprises an aircraft, a watercraft, a rail transport vehicle, an automobile, a truck, or a motorcycle.

Item 51: A vehicle comprising:
a vehicle body having a front portion and a passive vehicle drag reduction system, the front portion defining a first forward projection area, the passive vehicle drag reduction system comprising:
an airflow capture inlet having an inlet upstream end, an inlet downstream end, an air entry window, and a flow directing floor,
each of the air entry window and the flow directing floor extending from the inlet upstream end to the inlet downstream end,
the air entry window defining a second forward projection area that is at least 10% of the first forward projection area,
the flow directing floor being sloped upwardly from the inlet upstream end toward the inlet downstream end, the airflow capture inlet defining an airflow capture inlet direction;
a flow consolidating conduit that is close sided and extends from a consolidating conduit upstream end at the inlet downstream end, to a consolidating conduit downstream end;
an air driven rotor assembly having a rotor assembly inlet located downstream of the consolidating conduit downstream end, and an air driven rotor,
the rotor assembly inlet defining a rotor airflow inlet direction,
the air driven rotor having a laterally extending rotation axis transverse to the rotor airflow inlet direction, a plurality of air driven blades, and one or more air redirecting blades interior of the plurality of air driven blades, the air redirecting blades defining one or more rotor airflow outlet directions substantially parallel to the rotation axis; and
one or more flow exhaust conduits downstream of the air driven rotor assembly,
each of the one or more flow exhaust conduits being close sided and having a redirecting exhaust outlet located laterally of the air driven rotor assembly,
the redirecting exhaust outlet defining an exhaust outlet airflow direction that is substantially parallel to the airflow capture inlet direction.

The invention claimed is:

1. A passive vehicle drag reduction system comprising:
an airflow capture inlet having an inlet upstream end, an inlet downstream end, an air entry window, and a flow directing floor,
each of the air entry window and the flow directing floor extending from the inlet upstream end to the inlet downstream end,
the flow directing floor being sloped upwardly from the inlet upstream end toward the inlet downstream end,
the airflow capture inlet defining an airflow capture inlet direction;
a flow consolidating conduit that is close sided and extends from a consolidating conduit upstream end at the inlet downstream end, to a consolidating conduit downstream end;
an air driven rotor assembly having a rotor assembly inlet located downstream of the consolidating conduit downstream end, and an air driven rotor,
the rotor assembly inlet defining a rotor airflow inlet direction,
the air driven rotor having a laterally extending rotation axis transverse to the rotor airflow inlet direction, a plurality of air driven blades, and one or more air redirecting blades interior of the plurality of air driven blades, the air redirecting blades defining one or more rotor airflow outlet directions substantially parallel to the rotation axis; and
one or more flow exhaust conduits downstream of the air driven rotor assembly,
each of the one or more flow exhaust conduits being close sided and having a redirecting exhaust outlet located laterally of the air driven rotor assembly,
the redirecting exhaust outlet defining an exhaust outlet airflow direction that is substantially parallel to the airflow capture inlet direction.

2. The passive vehicle drag reduction system of claim 1, wherein the inlet downstream end is located at a higher elevation than the inlet upstream end.

3. The passive vehicle drag reduction system of claim 1, wherein the air entry window overlies the flow directing floor.

4. The passive vehicle drag reduction system of claim 1, wherein the airflow capture inlet is formed as an open sided conduit, and the flow directing floor and the air entry window form opposing sides of the open sided conduit.

5. The passive vehicle drag reduction system of claim 1, wherein the flow consolidating conduit includes a conduit floor, the conduit floor being contiguous with the flow directing floor.

6. The passive vehicle drag reduction system of claim 5, wherein the flow directing floor is concave and the conduit floor is convex.

7. The passive vehicle drag reduction system of claim 1, wherein the flow consolidating conduit includes one or more flow partitions that subdivide a cross-sectional area of the flow consolidating conduit into two or more flow paths,
   each flow partition and each flow path extending between the consolidating conduit upstream end and the consolidating conduit downstream end,
   each flow partition having a partition downstream end located upstream of the consolidating conduit downstream end,
      each flow path adjacent each flow partition merging at each partition downstream end into a merged flow path,
   the cross-sectional area of the flow consolidating conduit decreasing between the consolidating conduit upstream end and the consolidating conduit downstream end toward the consolidating conduit downstream end.

8. The passive vehicle drag reduction system of claim 1, wherein the plurality of air driven blades have a radially inward discharge direction.

9. The passive vehicle drag reduction system of claim 1, wherein the redirecting exhaust outlet includes one or more outlet redirecting blades curved in the exhaust outlet airflow direction.

10. The passive vehicle drag reduction system of claim 1, wherein the one or more flow exhaust conduits extend from an exhaust conduit upstream end to an exhaust conduit downstream end, and have a cross-sectional area, the cross sectional-area increasing between the exhaust conduit upstream end and the exhaust conduit downstream end toward the consolidating conduit downstream end.

11. A vehicle having the passive vehicle drag reduction system of claim 1, wherein the vehicle comprises an aircraft, a watercraft, a rail transport vehicle, an automobile, a truck, or a motorcycle.

12. A method of reducing aerodynamic drag of a vehicle, the vehicle comprising a passive vehicle drag reduction system, the method comprising:
   driving the vehicle forwardly, a front portion of the vehicle being impacted by wind;
   capturing the wind as airflow in an airflow capture inlet of the passive vehicle drag reduction system, the airflow capture inlet defining an airflow capture inlet direction;
   directing the airflow through a flow consolidating conduit of the passive vehicle drag reduction system, the flow consolidating conduit having a cross-sectional area that decreases towards a downstream end of the flow consolidating conduit, the airflow exiting the flow consolidating conduit as consolidated airflow;
   directing the consolidated airflow through an air driven rotor assembly of the passive vehicle drag reduction system, the air driven rotor assembly having one or more air redirecting blades, the consolidated airflow exiting the air driven rotor assembly as redirected airflow; and
   directing the redirected airflow through one or more flow exhaust conduits of the passive vehicle drag reduction system, the one or more flow exhaust conduits having a redirecting exhaust outlet located laterally of the air driven rotor assembly, the redirected airflow exiting the one or more flow exhaust conduits through the redirecting exhaust outlet in an exhaust outlet airflow direction that is substantially parallel to the airflow capture inlet direction.

13. The method of claim 12, wherein said capturing comprises moving the airflow across an upwardly sloped flow directing floor of the airflow capture inlet from an upstream end of the airflow capture inlet to a downstream end of the airflow capture inlet.

14. The method of claim 13, wherein the upwardly sloped flow directing floor is concave, and said directing the airflow through the flow consolidating conduit comprises moving the airflow across a convex conduit floor of the flow consolidating conduit that is contiguous with the upwardly sloped flow directing floor.

15. The method of claim 12, wherein said capturing comprises capturing the airflow through an air entry window of the airflow capture inlet, the air entry window defining a first forward projection area that is at least 10% of a second forward projection area defined by a front portion of a vehicle body of the vehicle.

16. The method of claim 12, wherein said directing the airflow through the flow consolidating conduit comprises directing the airflow through two or more flow paths defined by one or more flow partitions of the flow consolidating conduit.

17. The method of claim 12, wherein the redirecting exhaust outlet includes one or more outlet redirecting blades curved in the exhaust outlet airflow direction.

18. The method of claim 12, wherein the one or more flow exhaust conduits extend from an exhaust conduit upstream end to an exhaust conduit downstream end, and have a cross-sectional area, the cross sectional-area increasing between the exhaust conduit upstream end and the exhaust conduit downstream end toward the consolidating conduit downstream end.

19. The method of claim 12, wherein the vehicle comprises an aircraft, a watercraft, a rail transport vehicle, an automobile, a truck, or a motorcycle.

20. A vehicle comprising:
   a vehicle body having a front portion and a passive vehicle drag reduction system, the front portion defining a first forward projection area, the passive vehicle drag reduction system comprising:
      an airflow capture inlet having an inlet upstream end, an inlet downstream end, an air entry window, and a flow directing floor,
         each of the air entry window and the flow directing floor extending from the inlet upstream end to the inlet downstream end,
         the air entry window defining a second forward projection area that is at least 10% of the first forward projection area,
         the flow directing floor being sloped upwardly from the inlet upstream end toward the inlet downstream end,
         the airflow capture inlet defining an airflow capture inlet direction;
      a flow consolidating conduit that is close sided and extends from a consolidating conduit upstream end at the inlet downstream end, to a consolidating conduit downstream end;
      an air driven rotor assembly having a rotor assembly inlet located downstream of the consolidating conduit downstream end, and an air driven rotor,
         the rotor assembly inlet defining a rotor airflow inlet direction,
         the air driven rotor having a laterally extending rotation axis transverse to the rotor airflow inlet direction, a plurality of air driven blades, and one or more air redirecting blades interior of the plurality of air driven blades, the air redirecting blades defining one or more rotor airflow outlet directions substantially parallel to the rotation axis; and one or more flow exhaust conduits downstream of the air driven rotor assembly,
  each of the one or more flow exhaust conduits being close sided and having a redirecting exhaust outlet located laterally of the air driven rotor assembly, the redirecting exhaust outlet defining an exhaust outlet airflow direction that is substantially parallel to the airflow capture inlet direction.

* * * * *